United States Patent
Yamamoto et al.

(10) Patent No.: US 10,393,927 B2
(45) Date of Patent: Aug. 27, 2019

(54) DIFFUSER AND METHOD FOR MANUFACTURING THE SAME

(71) Applicant: NALUX CO., LTD., Osaka-shi, Osaka (JP)

(72) Inventors: Kazuya Yamamoto, Osaka (JP); Makio Nishimaki, Osaka (JP); Daisuke Seki, Osaka (JP)

(73) Assignee: NALUX CO., LTD., Osaka-shi, Osaka (JP)

(*) Notice: Subject to any disclaimer, the term of this patent is extended or adjusted under 35 U.S.C. 154(b) by 162 days.

(21) Appl. No.: 15/723,570

(22) Filed: Oct. 3, 2017

(65) Prior Publication Data
US 2018/0024280 A1  Jan. 25, 2018

Related U.S. Application Data

(63) Continuation of application No. PCT/JP2016/060106, filed on Mar. 29, 2016.
(Continued)

(51) Int. Cl.
*G02B 5/02* (2006.01)
*B29C 33/42* (2006.01)
(Continued)

(52) U.S. Cl.
CPC ............ *G02B 5/0268* (2013.01); *B29C 33/42* (2013.01); *B29C 33/424* (2013.01); *F21V 3/049* (2013.01); *F21V 5/004* (2013.01); *G02B 5/0221* (2013.01)

(58) Field of Classification Search
CPC .... G02B 5/0268; G02B 5/0221; B29C 33/42; B29C 33/424; F21V 3/049; F21V 5/004
See application file for complete search history.

(56) References Cited

U.S. PATENT DOCUMENTS

| | | |
|---|---|---|
| 6,241,903 B1 | 6/2001 | Savant et al. |
| 6,462,888 B2 | 10/2002 | Savant et al. |

(Continued)

FOREIGN PATENT DOCUMENTS

| | | |
|---|---|---|
| CA | 2 341 189 | 10/2007 |
| JP | 63-221329 A | 9/1988 |

(Continued)

OTHER PUBLICATIONS

International Search Report & Written Opinion dated Jul. 5, 2016 corresponding to International Patent Application No. PCT/JP2016/060106, and English translation thereof.

*Primary Examiner* — Alan B Cariaso
(74) *Attorney, Agent, or Firm* — Squire Patton Boggs (US) LLP

(57) ABSTRACT

A diffuser is provided with a recess-protrusion structure formed on a plane. When a z-axis is defined as a normal to the plane, an x-axis is defined on the plane, the x-axis is divided into plural intervals, Snx represents length of an interval nx, Sx-max and Sx-min represent the maximum and the minimum of Snx, respectively, the relationship $$2 < Sx\text{-max}/Sx\text{-min}$$

holds, Snx varies on a random basis between Sx-min and Sx-max, in an xz cross section, a recess portion and a protrusion portion are formed on each of adjacent intervals along the x-axis, respectively, and when dznx represents a difference between the maximum and the minimum of z coordinate of the recess-protrusion structure in the interval nx in the xz cross section, Anx represents a ratio between dznx and Snx, Anx-max and Anx-min represent the maximum and the minimum of Anx, the relationship $$Ax\text{-max}/Ax\text{-min} < 1.3$$

holds.

8 Claims, 19 Drawing Sheets

Related U.S. Application Data

(60) Provisional application No. 62/143,398, filed on Apr. 6, 2015.

(51) Int. Cl.
*F21V 3/04* (2018.01)
*F21V 5/00* (2018.01)

(56) References Cited

U.S. PATENT DOCUMENTS

| | | | |
|---|---|---|---|
| 7,179,527 B2 * | 2/2007 | Sato | C23C 16/0272 |
| | | | 136/255 |
| 2001/0001459 A1 | 5/2001 | Savant et al. | |
| 2001/0002355 A1 | 5/2001 | Savant et al. | |
| 2015/0285984 A1 * | 10/2015 | Chen | G02B 6/0061 |
| | | | 362/618 |
| 2016/0230048 A1 * | 8/2016 | Edmonds | C09J 7/385 |
| 2017/0074481 A1 | 3/2017 | Seki et al. | |

FOREIGN PATENT DOCUMENTS

| | | |
|---|---|---|
| JP | 2009-265212 A | 11/2009 |
| JP | 2011-028080 A | 2/2011 |
| JP | 2011-034072 A | 2/2011 |
| JP | 2013-148921 A | 8/2013 |
| WO | WO 00/11499 A1 | 3/2000 |
| WO | WO 2011/004903 A1 | 1/2011 |
| WO | WO 2015/182619 A1 | 12/2015 |

* cited by examiner

DIFFUSER AND METHOD FOR MANUFACTURING THE SAME

CROSS REFERENCE TO RELATED APPLICATION

This is a Continuation of International Patent Application No. PCT/JP2016/060106 filed Mar. 29, 2016, and which claims priority from U.S. Provisional Patent Application No. 62/143,398, dated Apr. 6, 2015. The contents of these applications are hereby incorporated by reference.

BACKGROUND

Technical Field

The present invention relates to a diffuser, a mold for a diffuser and a method for manufacturing a diffuser.

Background Art

A diffuser for achieving a smooth distribution of radiant intensity or of irradiance is used for a wide variety of applications such as common illumination, light sources of optical sensors for industrial use, and image display screens.

As a diffuser for achieving a smooth distribution of radiant intensity or of irradiance, a Gaussian diffuser that refracts rays of light having entered the diffuser to achieve a Gaussian distribution of radiant intensity is well known. A Gaussian diffuser is provided with a continuous rough surface with a perfectly random distribution of height. As Gaussian diffusers, one that is manufactured by transferring a recess-protrusion structure of a mold that is made from a base material such as glass by sanding, onto a plastic material and one that is manufactured by using a base material provided with a shape formed by exposure to light with a random distribution of intensity, which is called speckle as a mold to transfer the recess-protrusion structure onto a plastic material (Patent Document 1, for example) are known. Although these Gaussian diffusers achieve a smooth distribution of radiant intensity or of irradiance, a degree of freedom of design is small. Further, when a divergence angle is enlarged, transmittance deteriorates For applications that require a higher transmittance or a distribution of radiant intensity that is unlike a Gaussian distribution, diffusers using a microlens array in palace of Gaussian diffusers have been developed. In the diffusers using a microlens array, a distribution of radiant intensity can be controlled by adjusting a shape of microlenses. Further, a higher transmittance can be obtained in comparison with diffusers using a rough surface. On the other hand, the diffusers using a microlens array have disadvantages described below. Firstly, diffraction waves are generated, because the periodic structure of the array generates interference between wave fronts of rays of light from respective microlenses. Accordingly, unevenness in a distribution of radiant intensity or of irradiance is apt to appear. Secondly, when the curvature radius of microlenses becomes smaller, unevenness due to diffraction caused by the aperture itself of each microlens is apt to appear.

Accordingly, diffusers in which microlenses are arranged on a random base, or the surface shape or the aperture shape is made different from one microlens to another have been proposed. For example, Patent Document 2 describes a focal plane plate for focusing in which microlenses are arranged with randomness so as to reduce unevenness in luminance due to diffraction caused by the periodic structure of the microlens array. Further, Patent Document 3 describes a microlens array diffuser in which microlenses are arranged with randomness so as to reduce unevenness due to diffraction caused by the aperture itself of a microlenses.

However, in production of a diffuser using a microlens array there is a problem of higher manufacturing costs, because a mold for microlenses requires machining or laser processing. Further, there is another problem of difficulty in manufacturing a large-area diffuser.

A diffuser that offers easy control of radiant intensity, is not apt to generate unevenness in a distribution of radiant intensity or of irradiance, and can be easily manufactured has not been developed.

Given these circumstances, there is a need for a diffuser that offers easy control of radiant intensity, is not apt to generate unevenness in a distribution of radiant intensity or of irradiance, and can be easily manufactured.

PATENT DOCUMENTS

Patent document 1: U.S. Pat. No. 6,462,888B2
Patent document 2: JPS63-221329
Patent document 3: WO2015/182619A1)

Accordingly, the object of the present application is to provide a diffuser that offers easy control of radiant intensity, is not apt to generate unevenness in a distribution of radiant intensity or of irradiance, and can be easily manufactured.

SUMMARY OF INVENTION

A diffuser according to the first aspect of the invention is provided with a recess-protrusion structure formed on a plane. When a z-axis is defined as a normal to the plane, an x-axis is defined on the plane, the x-axis is divided into plural intervals, nx represents a positive integer for identifying an interval along the x-axis, Snx represents length in the x-axis direction of an interval nx, Sx-max represents the maximum value of Snx, and Sx-min represents the minimum value of Snx, the relationship $$2 < Sx\text{-max}/Sx\text{-min}$$

holds, Snx varies on a random basis between Sx-min and Sx-max, the recess-protrusion structure is configured such that in an xz cross section, a recess portion and a protrusion portion are formed on each of adjacent intervals along the x-axis, respectively, and when dznx represents a difference between the maximum value and the minimum value of z coordinate of the recess-protrusion structure in the interval nx in the xz cross section, Anx represents a ratio between dznx and Snx, Anx-max represents the maximum value of Anx, and Anx-min represents the minimum value of Anx, the recess-protrusion structure is configured such that the relationship $$Ax\text{-max}/Ax\text{-min} < 1.3$$

holds.

In the diffuser according to the present aspect, when Snx represents length in the x-axis direction of an interval nx, Sx-max represents the maximum value of Snx, and Sx-min represents the minimum value of Snx, the relationship $$2 < Sx\text{-max}/Sx\text{-min}$$

holds, and Snx varies on a random basis between Sx-min and Sx-max. Accordingly, the diffuser is less apt to generate unevenness in radiant intensity and irradiance in the x-axis direction.

Further, the recess-protrusion structure of the diffuser according to the present aspect is configured such that in an xz cross section, a recess portion and a protrusion portion are formed on each of adjacent intervals along the x-axis, respectively, and when dznx represents a difference between the maximum value and the minimum value of z coordinate of the recess-protrusion structure in the interval nx in the xz cross section, Anx represents a ratio between dznx and Snx, Anx-max represents the maximum value of Anx, and Anx-min represents the minimum value of Anx, the recess-protrusion structure is configured such that the relationship $$Ax\text{-max}/Ax\text{-min}<1.3$$

holds. Accordingly, in the diffuser, radiant intensity in in the x-axis direction can be easily controlled.

In a diffuser according to the first embodiment of the present aspect, when in the xz cross section, z coordinate of the recess-protrusion structure is represented as a function of x, the function of x on each interval can be approximated by a smooth function.

In a diffuser according to the second embodiment of the present aspect, the function of x on each interval can be approximated by a quadratic function.

In a diffuser according to the third embodiment of the present aspect, when a y-axis is defined on the plane so as to be orthogonal to the x-axis, the recess-protrusion structure is configured such that the shape of an xz cross section is identical independently of y coordinate.

In a diffuser according to the fourth embodiment of the present aspect, when a y-axis is defined on the plane so as to be orthogonal to the x-axis, the y-axis is divided into plural intervals, my represents a positive integer for identifying an interval along the y-axis, Smy represents length in the y-axis direction of an interval my, Sy-max represents the maximum value of Smy, and Sy-min represents the minimum value of Smy, the relationship $$2<Sy\text{-max}/Sy\text{-min}$$

holds, Smy varies on a random basis between Sy-min and Sy-max, the recess-protrusion structure is configured such that in a yz cross section, a recess portion and a protrusion portion are formed on each of adjacent intervals along the y-axis, respectively, and when dzmy represents a difference between the maximum value and the minimum value of z coordinate of the recess-protrusion structure in the interval my in the yz cross section, Amy represents a ratio between dznx and Smy, Ay-max represents the maximum value of Amy, and Ay-min represents the minimum value of Amy, the recess-protrusion structure is configured such that the relationship $$Ay\text{-max}/Ay\text{-min}<1.3$$

holds.

In the diffuser according to the present embodiment, when Smy represents length in the y-axis direction of an interval my, Sy-max represents the maximum value of Smy, and Sy-min represents the minimum value of Smy, the relationship $$2<Sy\text{-max}/Sy\text{-min}$$

holds, and Smy varies on a random basis between Sy-min and Sy-max. Accordingly, the diffuser is less apt to generate unevenness in radiant intensity and irradiance in the y-axis direction.

Further, the recess-protrusion structure of the diffuser according to the present embodiment is configured such that in a yz cross section, a recess portion and a protrusion portion are formed on each of adjacent intervals along the y-axis, respectively, and when dzmy represents a difference between the maximum value and the minimum value of z coordinate of the recess-protrusion structure in the interval my in the yz cross section, Amy represents a ratio between dznx and Smy, Ay-max represents the maximum value of Amy, and Ay-min represents the minimum value of Amy, the recess-protrusion structure is configured such that the relationship $$Ay\text{-max}/Ay\text{-min}<1.3$$

holds. Accordingly, in the diffuser, radiant intensity in in the y-axis direction can be easily controlled.

A method for manufacturing a diffuser according to the second aspect of the invention is a method for manufacturing a diffuser provided with a recess-protrusion structure. When a z-axis is defined as a normal to a plane of a substrate, and an x-axis is defined on the plane, the method includes the steps of dividing the x-axis into plural intervals such that the relationship $$2<Sx'\text{-max}/Sx'\text{-min}$$

holds, and Snx' varies on a random basis between Sx'-min and Sx'-max, where nx' represents a positive integer for identifying an interval along the x-axis, Snx' represents length in the x-axis direction of an interval nx', Sx'-max represents the maximum value of Snx', and Sx'-min represents the minimum value of Snx'; forming a provisional recess-protrusion structure on the substrate by etching such that in an xz cross section, a recess portion and a protrusion portion are formed on each of adjacent intervals along the x-axis, respectively; and forming a synthetic resin coating on the provisional recess-protrusion structure by spin coating such that the relationship $$Ax\text{-max}/Ax\text{-min}<1.3$$

holds, where an interval nx represents an interval along the x-axis that corresponds to a recess portion or a protrusion portion of the recess-protrusion structure coated with the synthetic resin coating in the xz cross section, Snx represents length in the x-axis direction of the interval nx, dznx represents a difference between the maximum value and the minimum value of z coordinate of the recess-protrusion structure in the interval nx in the xz cross section, Anx represents a ratio between dznx and Snx, Anx-max represents the maximum value of Anx, and Anx-min represents the minimum value of Anx.

In the method for manufacturing a diffuser according to the present aspect, intervals are determined such that the relationship $$2<Sx'\text{-max}/Sx'\text{-min}$$

holds, and Snx' varies on a random basis between Sx'-min and Sx'-max, where Snx' represents length in the x-axis direction of an interval nx' of the provisional recess-protrusion structure, Sx'-max represents the maximum value of Snx', and Sx'-min represents the minimum value of Snx'. Further, each of intervals of the recess-protrusion structure coated with the synthetic resin coating substantially corresponds to each of intervals of the provisional recess-protrusion structure. Accordingly, a diffuser manufactured by the method is less apt to generate unevenness in radiant intensity and irradiance in the x-axis direction.

In the method for manufacturing a diffuser according to the present aspect, the synthetic resin coating is formed such that the relationship $$Ax\text{-max}/Ax\text{-min}<1.3$$

holds, where an interval nx represents an interval along the x-axis that corresponds to a recess portion or a protrusion portion of the recess-protrusion structure coated with the synthetic resin coating, Snx represents length in the x-axis direction of the interval nx, dznx represents a difference between the maximum value and the minimum value of z coordinate of the recess-protrusion structure in the interval nx in the xz cross section, Anx represents a ratio between dznx and Snx, Anx-max represents the maximum value of Anx, and Anx-min represents the minimum value of Anx. Accordingly, in a diffuser manufactured by the method, radiant intensity in in the x-axis direction can be easily controlled.

In a method for manufacturing a diffuser according to a first embodiment of the present aspect, when a y-axis is defined on the plane so as to be orthogonal to the x-axis, in the step of forming the provisional recess-protrusion structure, the provisional recess-protrusion structure is formed such that the shape of an xz cross section is identical independently of y coordinate.

In a method for manufacturing a diffuser according to a second embodiment of the present aspect, when a y-axis is defined on the plane so as to be orthogonal to the x-axis, the method further includes the step of dividing the y-axis into plural intervals, before the step of forming the provisional recess-protrusion structure, such that the relationship $$2 < Sy\text{-max}/Sy\text{-min}$$

holds, and Smy' varies on a random basis between Sy'-min and Sy'-max, where my' represents a positive integer for identifying an interval along the y-axis, Smy' represents length in the y-axis direction of an interval my', Sy'-max represents the maximum value of Smy', and Sy'-min represents the minimum value of Smy', in the step of forming the provisional recess-protrusion structure, the provisional recess-protrusion structure is formed on the substrate such that in a yz cross section, a recess portion and a protrusion portion are formed on each of adjacent intervals along the y-axis, respectively, and in the step of forming the synthetic resin coating, the synthetic resin coating is formed such that the relationship $$Ay\text{-max}/Ay\text{-min} < 1.3$$

holds, where an interval my represents an interval along the y-axis that corresponds to a recess portion or a protrusion portion of the recess-protrusion structure coated with the synthetic resin coating in the yz cross section, Smy represents length in the y-axis direction of the interval my, dzmy represents a difference between the maximum value and the minimum value of z coordinate of the recess-protrusion structure in the interval my in the yz cross section, Amy represents a ratio between dznx and Smy, Ay-max represents the maximum value of Amy, and Ay-min represents the minimum value of Amy.

In the method for manufacturing a diffuser according to the present embodiment, intervals are determined such that the relationship $$2 < Sy\text{-max}/Sy\text{-min}$$

holds, and Smy' varies on a random basis between Sy'-min and Sy'-max, where my' represents a positive integer for identifying an interval along the y-axis, Smy' represents length in the y-axis direction of an interval my' of the provisional recess-protrusion structure, Sy'-max represents the maximum value of Smy', and Sy'-min represents the minimum value of Smy'. Further, each of intervals of the recess-protrusion structure coated with the synthetic resin coating substantially corresponds to each of intervals of the provisional recess-protrusion structure. Accordingly, a diffuser manufactured by the method is less apt to generate unevenness in radiant intensity and irradiance in the y-axis direction.

A mold for a diffuser according to the third aspect of the invention is a mold for a diffuser provided with a recess-protrusion structure formed on a plane. When a z-axis is defined as a normal to the plane, an x-axis is defined on the plane, the x-axis is divided into plural intervals, nx represents a positive integer for identifying an interval along the x-axis, Snx represents length in the x-axis direction of an interval nx, Sx-max represents the maximum value of Snx, and Sx-min represents the minimum value of Snx, the relationship $$2 < Sx\text{-max}/Sx\text{-min}$$

holds, Snx varies on a random basis between Sx-min and Sx-max, the recess-protrusion structure is configured such that in an xz cross section, a recess portion and a protrusion portion are formed on each of adjacent intervals along the x-axis, respectively, and when dznx represents a difference between the maximum value and the minimum value of z coordinate of the recess-protrusion structure in the interval nx in the xz cross section, Anx represents a ratio between dznx and Snx, Anx-max represents the maximum value of Anx, and Anx-min represents the minimum value of Anx, the recess-protrusion structure is configured such that the relationship $$Ax\text{-max}/Ax\text{-min} < 1.3$$

holds.

By the use of the mold according to the present aspect, the diffuser according to the first aspect described above can be manufactured.

DESCRIPTION OF EMBODIMENTS

Figure 1:
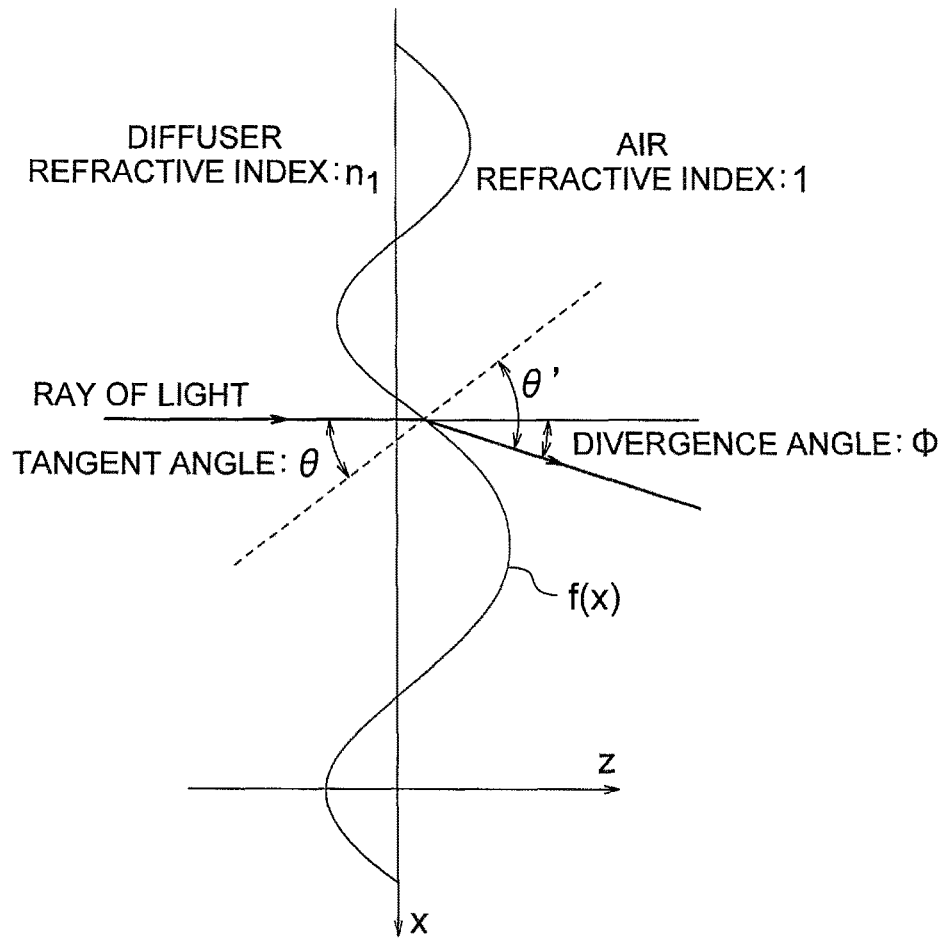
FIG. 1 illustrates a diffuser according to an embodiment of the present invention.

FIG. 1 illustrates a diffuser according to an embodiment of the present invention. The diffuser according to the embodiment of the present invention is provided with a recess-protrusion structure formed on a plane. An x-axis is defined on the plane, and a z-axis that is perpendicular to the plane is defined. Coordinate in the z-axis direction of the profile of the recess-protrusion structure is represented as f(x). FIG. 1 shows an xz cross section of the diffuser. In FIG. 1, a ray of light travels in the z-axis direction from the diffuser to the air. An angle (acute angle) between the ray of light and the normal to the interface between the diffuser and the air at the point where the ray of light reaches the interface surface is represented as θ. The angle θ is referred to as a tangent angle. At the interface surface, an angle (acute angle) between the refracted ray of light and the normal to the interface surface is represented as θ'. An angle ϕ between the refracted ray of light and the z-axis can be represented by the following expression according to Snell's law.

$$\phi = \theta' - \theta$$
$$= \arcsin(n_1 \sin\theta) - \theta$$

In the expression, $n_1$ represents refractive index of the material of the diffuser. When θ is sufficiently small, the following expression holds.

$$\phi \approx (n_1 - 1)\theta$$

The angle ϕ is referred to as a divergence angle.

The divergence angle ϕ is an angle (acute angle) that the ray of light that has passed through the diffuser forms with the z-axis, that is, the direction perpendicular to the plane, and therefore when the divergence angle ϕ remains unchanged independently of x, rays of light that have passed through the diffuser travel in the direction determined by the divergence angle. On the other hand, the following expression holds from FIG. 1.

$$\frac{df}{dx} = \theta$$

Accordingly, in order to keep the divergence angle unchanged independently of x, the following expression has to hold.

$$\frac{d\phi}{dx} \approx (n_1 - 1)\frac{d\theta}{dx} \approx (n_1 - 1)\frac{d^2 f}{x^2} = const.$$

The x-axis is divided into intervals, each of which corresponds to a recess portion or a protrusion portion of the recess-protrusion structure, and f(x) is represented by an interval function that is a quadric function as below.

$$f(x) = f_n(x) \text{ at } x_n < x < x_{n+1} \quad (1)$$

The interval function $f_n(x)$ is defined as below.

$$f_n(x) = A \cdot \frac{s_n}{\bar{s}}(-1)^{n+1}\left(2\frac{x-x_n}{s_n} - 1\right)^2 \quad (2)$$

$$s_n = x_{n+1} - x_n$$

$$\bar{s} = \frac{\sum s_n}{N}$$

where n is a positive integer for identifying an interval, $s_n$ is length of interval n, and N is the total number of intervals.

Figure 2:
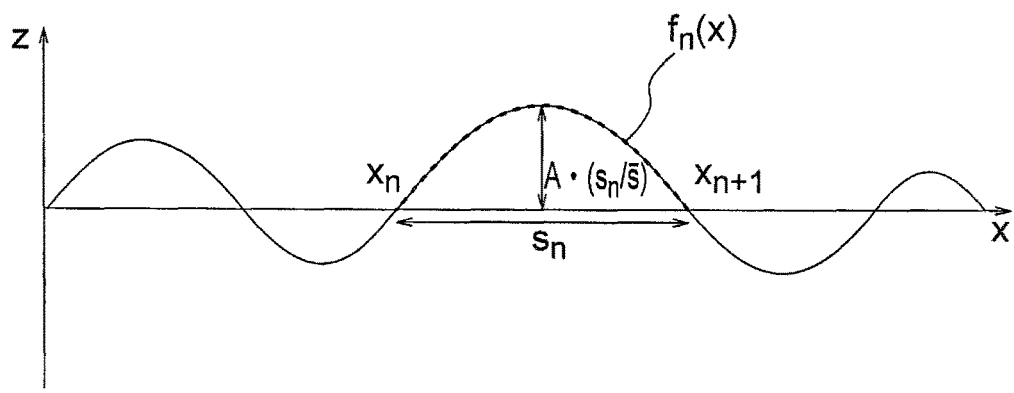
FIG. 2 shows an xz cross section of an diffuser represented by the interval function $f_n(x)$.

FIG. 2 shows an xz cross section of an diffuser represented by the interval function $f_n(x)$. The width of the interval function $f_n(x)$ is represented as $s_n$, and the height of the interval function $f_n(x)$ is represented as below.

$$A \cdot \frac{s_n}{\bar{s}}$$

Accordingly, an aspect ratio that is a ratio of the height to the width of an interval is as below, and remains unchanged independently of n.

$$\frac{A}{\bar{s}}$$

Further, the following expressions hold for any interval n.

$$f_n(x_n) = f_n(x_{n+1}) = 0$$

$$\frac{df_n(x_n)}{dx} = -\frac{df_n(x_{n+1})}{dx} = -\frac{df_{n+1}(x_{n+1})}{dx} = (-1)^n \frac{4A}{\bar{s}}$$

On the other hand, the divergence angle $\phi$ can be represented by the following expression as already described using FIG. 1.

$$\phi \approx (n_1 - 1)\theta$$

Further, the following expression holds.

$$\theta = \arctan\left(\frac{f_n(x)}{dx}\right)$$

The tangent angle $\theta$ and the divergence angle $\phi$ are defined such that they take positive and negative values according to the following term.

$$\arctan\left(\frac{f_n(x)}{dx}\right)$$

Accordingly, the divergence angle $\phi$ of the interval function $f_n(x)$ falls within the following range.

$$-(n_1 - 1) \cdot \arctan\left(\frac{4A}{\bar{s}}\right) \leq \phi \leq (n_1 - 1) \cdot \arctan\left(\frac{4A}{\bar{s}}\right)$$

As a result, light distribution of the interval function $f_n(x)$ is roughly even in the above-described range of angle for an arbitrary interval n. Accordingly, light distribution of the whole f(x) is roughly even in the following range of angle.

$$-(n_1 - 1) \cdot \arctan\left(\frac{4A}{\bar{s}}\right) \leq \phi \leq (n_1 - 1) \cdot \arctan\left(\frac{4A}{\bar{s}}\right) \quad (3)$$

If the width $s_n$ of interval n is constant, unevenness in illuminance due to diffraction caused by the periodicity, that is, unevenness due to diffraction is generated. In order to reduce such unevenness due to diffraction, the width $s_n$ of interval n should be made to vary. Unevenness due to diffraction caused by the periodicity of the recess-protrusion structure can be reduced by making the width $s_n$ vary in the range between $s_{max}$ and $s_{min}$ inclusive, which satisfy $$2 < \frac{s_{max}}{s_{min}}$$

where $s_{max}$ and $s_{min}$ represent the maximum value and the minimum value of the width $s_n$ of interval n, respectively.

Figure 3:
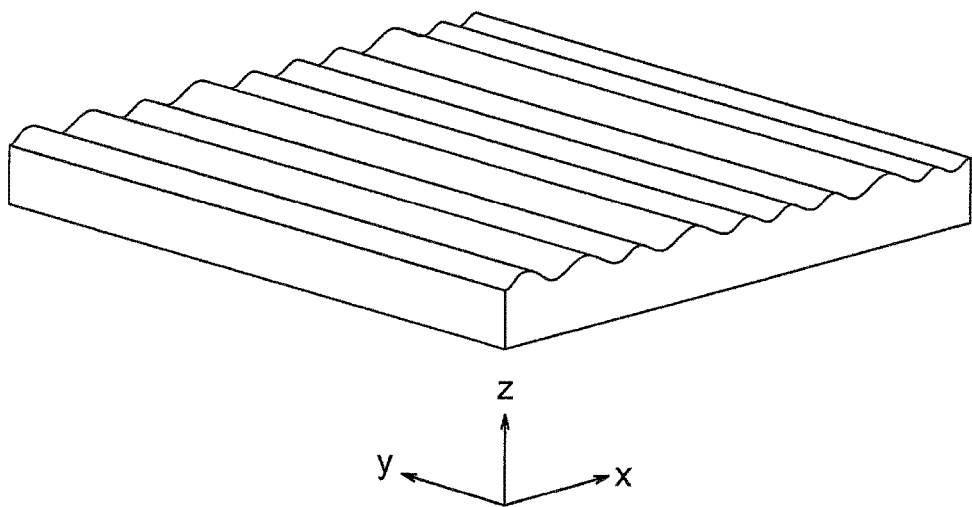
FIG. 3 shows a diffuser according to an example of the present invention.

FIG. 3 shows a diffuser according to an example of the present invention. An x-axis and a y-axis orthogonal to the x-axis are provided on a plane. An xz cross section of the diffuser shown in FIG. 3 is similar to that shown in FIG. 2. Further, the shape of an xz cross section remains unchanged independently of y coordinate, and is identical for any value of y coordinate. Thus, the diffuser shown in FIG. 3 is provided with a one-dimensional recess-protrusion structure.

Figure 4:
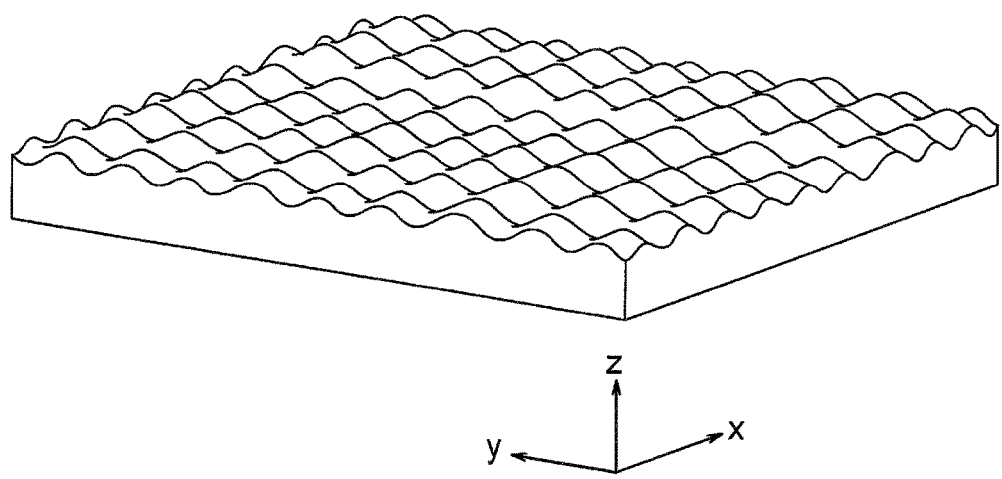
FIG. 4 shows a diffuser according to another example of the present invention.

FIG. 4 shows a diffuser according to another example of the present invention. An x-axis and a y-axis orthogonal to the x-axis are provided on a plane. An xz cross section of the diffuser shown in FIG. 4 is similar to that shown in FIG. 2. Further, a yz cross section of the diffuser shown in FIG. 4 is also similar to that shown in FIG. 2. Thus, the diffuser shown in FIG. 4 is provided with a two-dimensional recess-protrusion structure.

Performance of diffusers will be examined by simulation. The diffusers according to the following simulation examples and the comparative simulation example are provided with an xz cross section as shown in FIG. 2, and the shape of the cross section can be expressed by Expressions (1) and (2). The diffusers are provided with a first surface and a second surface. The first surface is the surface of a recess-protrusion structure formed on a plane, which has a shape that can be expressed by Expressions (1) and (2). The second surface is a flat surface that is parallel to the plane. Further, the material of the diffusers is an acrylic, the refractive index of which is 1.494.

Arrangements are made such that a parallel beam of light is incident normally on the second flat surface of the diffusers of the simulation examples and the comparative simulation example. The parallel beam of light is diffused by the recess-protrusion structure. A flat surface for evaluating irradiance is placed at a predetermined distance in the z-axis direction from the diffuser such that the flat surface for evaluating irradiance is parallel to the plane and the second flat surface of the diffuser. The flat surface for evaluating irradiance is referred to as an evaluation surface. The wavelength of the incident light is 550 nm, the power is 1 watt, and the beam diameter is 0.8 mm. Further, the distance from the plane of the diffuser to the evaluation surface is 200 mm.

Comparative Simulation Example

A diffuser according to the comparative simulation example is provided with a one-dimensional recess-protrusion structure as shown in FIG. 3. In other words, the shape of an xz cross section of the diffuser remains unchanged independently of y coordinate, and is identical for any value of y coordinate.

The parameters of Expression (2) are as below.
A=0.974 (μm)
$s_n$=10.0 (μm)
$s_n$ for any interval n is identical.

Figure 5:
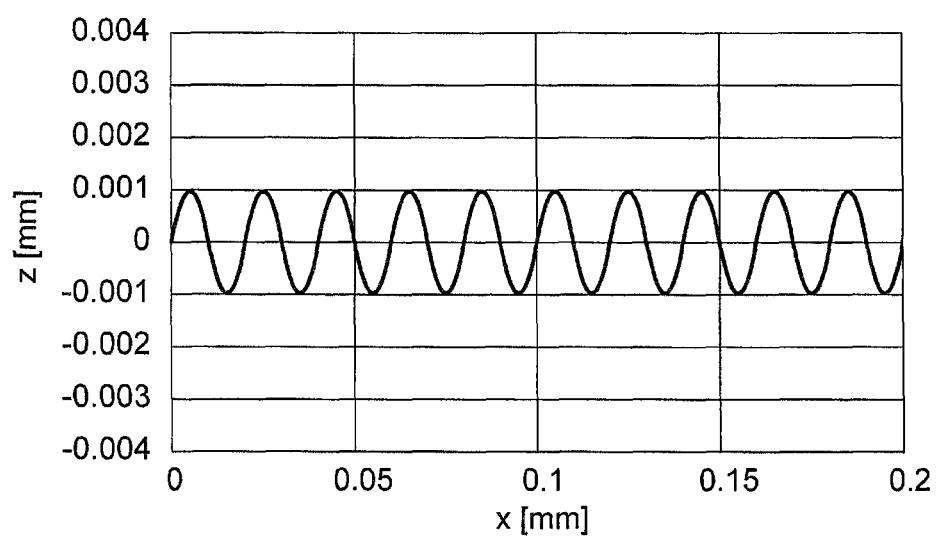
FIG. 5 shows the shape of an xz cross section of the diffuser according to the comparative simulation example.

FIG. 5 shows the shape of an xz cross section of the diffuser according to the comparative simulation example. The horizontal axis of FIG. 5 represents x coordinate, and the vertical axis of FIG. 5 represents z coordinate.

Figure 6A:
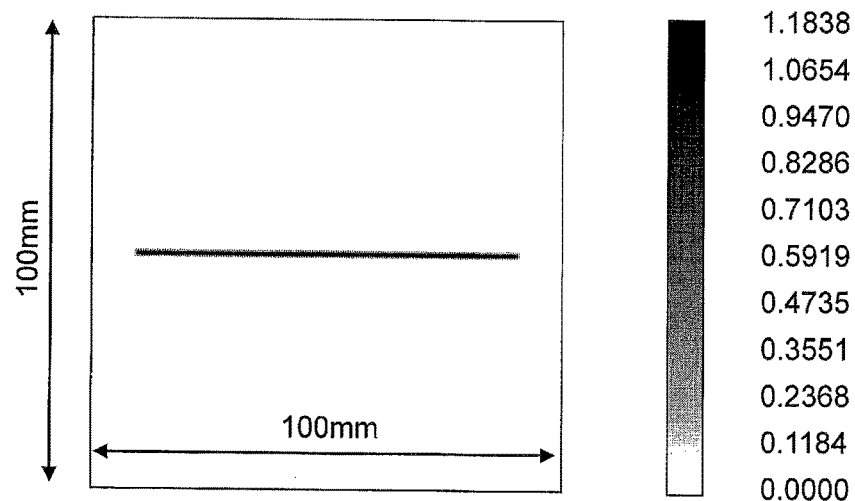
FIG. 6A shows irradiance on the evaluation surface in the case that an incoherent and parallel beam of light is incident on the diffuser according to the comparative simulation example.

FIG. 6A shows irradiance on the evaluation surface in the case that an incoherent and parallel beam of light is incident on the diffuser according to the comparative simulation example. The unit of irradiance is watt per square centimeter, and irradiance is represented by darkness.

Figure 6B:
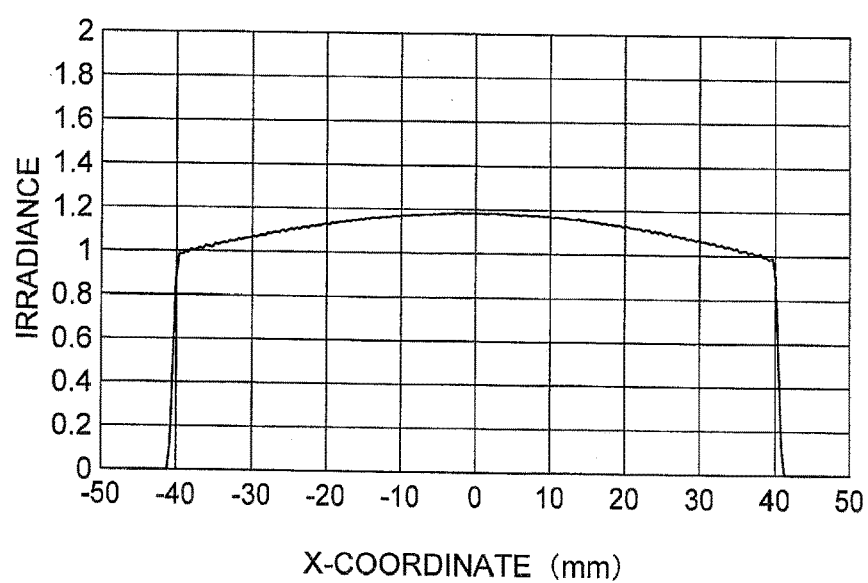
FIG. 6B shows irradiance on the evaluation surface in the case that an incoherent and parallel beam of light is incident on the diffuser according to the comparative simulation example.

FIG. 6B shows irradiance on the evaluation surface in the case that an incoherent and parallel beam of light is incident on the diffuser according to the comparative simulation example. The horizontal axis of FIG. 6B represents x coordinate, and the vertical axis of FIG. 6B represents irradiance. The x coordinate is that of the diffuser, and 0 of the x coordinate corresponds to the center in the x-axis direction of the recess-protrusion structure of the diffuser. The unit of irradiance is watt per square centimeter.

The range of the divergence angle in an x-z cross section of the comparative simulation example is ±10.5 degrees according to Expression (3). Accordingly, the width in the x-axis direction of the irradiated area on the evaluation surface can be calculated as below.

2·200·tan(10.5°)=74.3 (mm)

The above-described value is substantially equal to that of the width in the x-axis direction of the irradiated area shown in FIG. 6B.

According to FIG. 6A and FIG. 6B, by the diffuser of the comparative simulation example, an incident beam of light is diverged to a beam of light that provides a linear and substantially even distribution of irradiance.

Figure 7A:
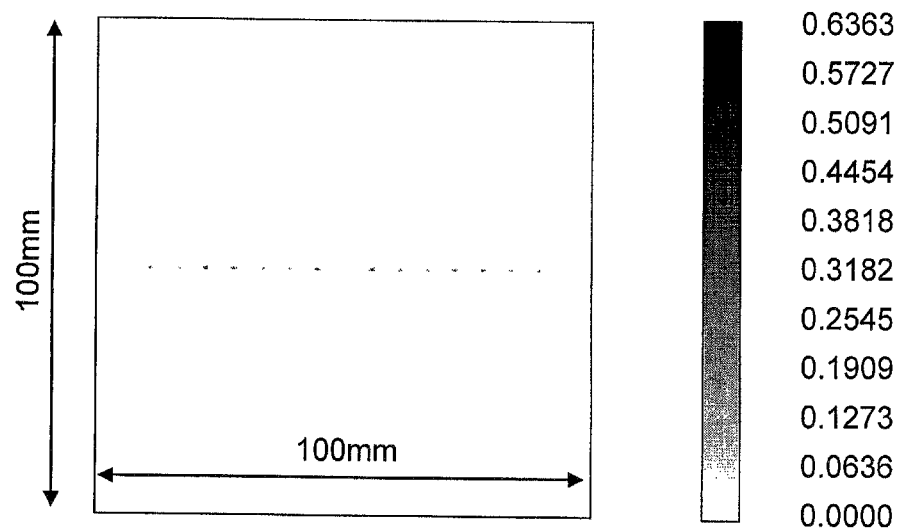
FIG. 7A shows irradiance on the evaluation surface in the case that a coherent and parallel beam of light is incident on the diffuser according to the comparative simulation example

FIG. 7A shows irradiance on the evaluation surface in the case that a coherent and parallel beam of light is incident on the diffuser according to the comparative simulation example. The unit of irradiance is watt per square centimeter, and irradiance is represented by darkness.

Figure 7B:
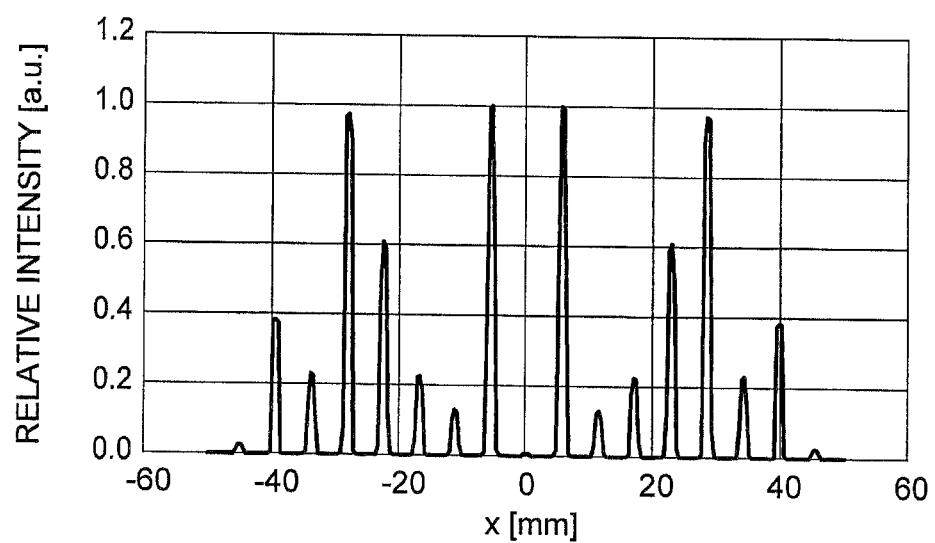
FIG. 7B shows irradiance on the evaluation surface in the case that a coherent and parallel beam of light is incident on the diffuser according to the comparative simulation example.

FIG. 7B shows irradiance on the evaluation surface in the case that a coherent and parallel beam of light is incident on the diffuser according to the comparative simulation example. The horizontal axis of FIG. 7B represents x coordinate, and the vertical axis of FIG. 7B represents relative intensity of irradiance. The relative intensity is defined such that the peak value of irradiance corresponds to 1. The x coordinate is that of the diffuser, and 0 of the x coordinate corresponds to the center in the x-axis direction of the recess-protrusion structure of the diffuser. The unit of irradiance is watt per square centimeter.

According to FIG. 7A and FIG. 7B, the periodicity of the recess-protrusion structure of the diffuser according to the comparative simulation example causes diffraction so that on the evaluation surface, irradiance shows peaks of intensity and areas where intensity is 0.

Simulation Example 1

A diffuser according to the simulation example 1 is provided with a one-dimensional recess-protrusion structure as shown in FIG. 3. In other words, the shape of an xz cross section is represented by Expressions (1) and (2), remains unchanged independently of y coordinate, and is identical for any value of y coordinate.

The parameters of Expression (2) are as below.
A=0.974 (μm)
5.0 (μm)<$s_n$<15.0 (μm)
$s_n$ varis from one interval to another, and its distribution is a uniform distribution in the range from 5 μm to 15 μm. In order to generate the uniform distribution, a pseudorandom number sequence prepared in a programming language was used. In the present example, the following relationships hold when the upper limit and the lower limit of $s_n$ are represented respectively as $s_{max}$ and $s_{min}$.

$$\bar{s} = 10.0 \ (\mu m)$$

$$2 < \frac{s_{max}}{s_{min}} = \frac{15}{5} = 3$$

Figure 8:
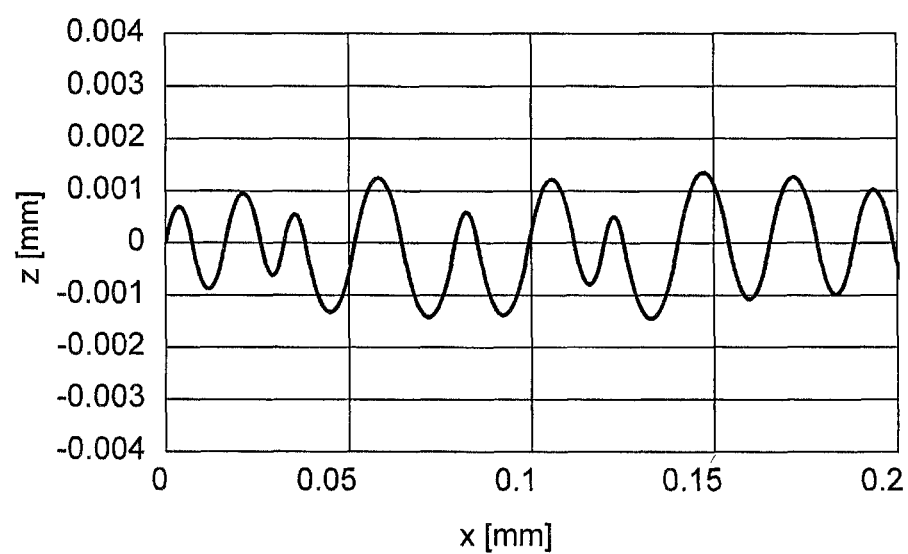
FIG. 8 shows the shape of an xz cross section of the diffuser according to the simulation example 1.

FIG. 8 shows the shape of an xz cross section of the diffuser according to the simulation example 1. The horizontal axis of FIG. 8 represents x coordinate, and the vertical axis of FIG. 8 represents z coordinate.

Figure 9A:
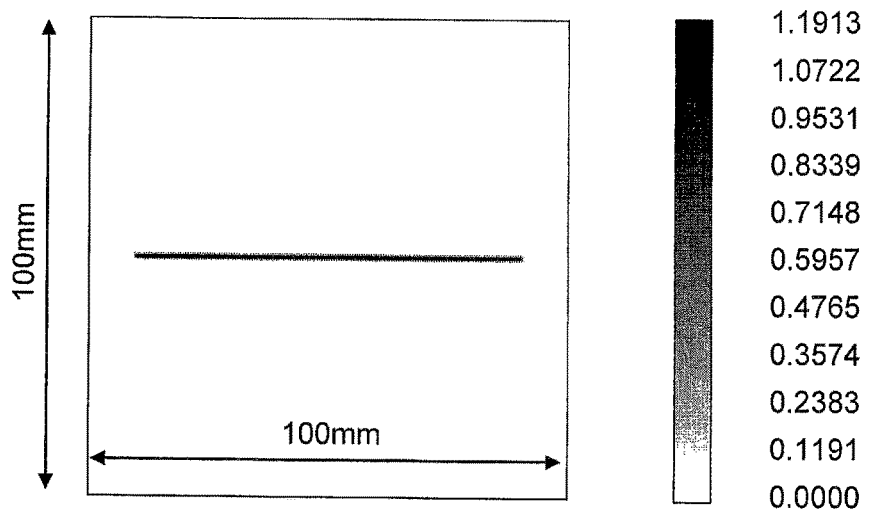
FIG. 9A shows irradiance on the evaluation surface in the case that an incoherent and parallel beam of light is incident on the diffuser according to the simulation example 1.

FIG. 9A shows irradiance on the evaluation surface in the case that an incoherent and parallel beam of light is incident on the diffuser according to the simulation example 1. The unit of irradiance is watt per square centimeter, and irradiance is represented by darkness.

Figure 9B:
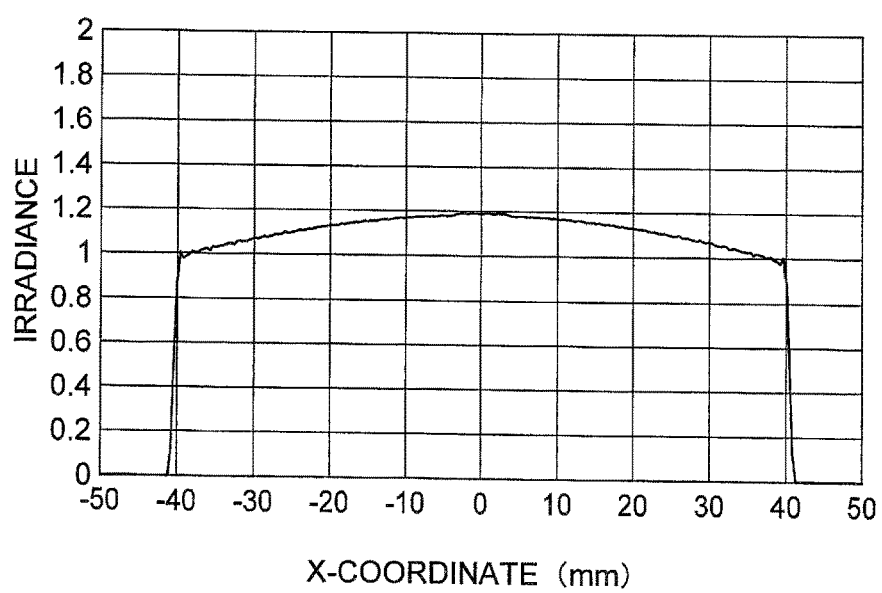
FIG. 9B shows irradiance on the evaluation surface in the case that an incoherent and parallel beam of light is incident on the diffuser according to the simulation example 1.

FIG. 9B shows irradiance on the evaluation surface in the case that an incoherent and parallel beam of light is incident on the diffuser according to the simulation example 1. The horizontal axis of FIG. 9B represents x coordinate, and the vertical axis of FIG. 9B represents irradiance. The x coordinate is that of the diffuser, and 0 of the x coordinate corresponds to the center in the x-axis direction of the recess-protrusion structure of the diffuser. The unit of irradiance is watt per square centimeter.

The range of the divergence angle in an x-z cross section of the simulation example 1 is ±10.5 degrees according to Expression (3). Accordingly, the width in the x-axis direction of the irradiated area on the evaluation surface can be calculated as below.

2·200·tan(10.5°)=74.3 (mm)

The above-described value is substantially equal to that of the width in the x-axis direction of the irradiated area shown in FIG. 9B.

According to FIG. 9A and FIG. 9B, by the diffuser of the simulation example 1, an incident beam of light is diverged to a beam of light that provides a linear and substantially even distribution of irradiance on the evaluation surface.

Figure 10A:
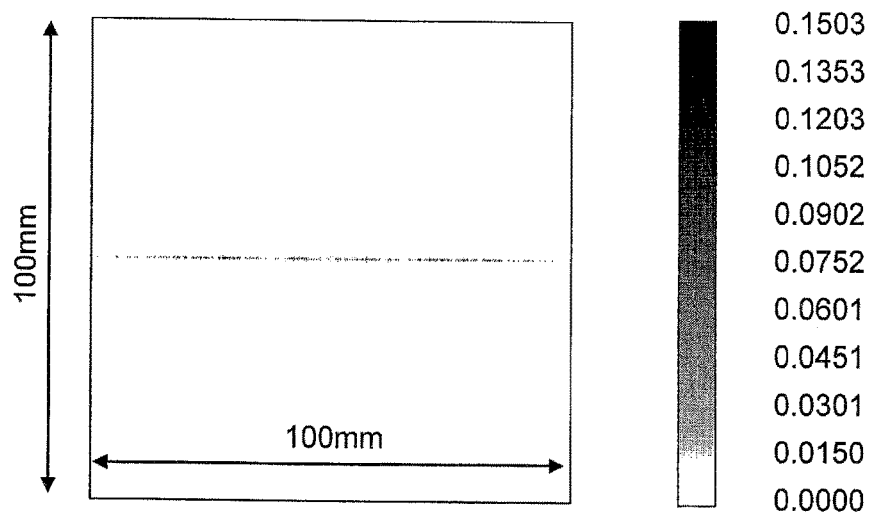
FIG. 10A shows irradiance on the evaluation surface in the case that a coherent and parallel beam of light is incident on the diffuser according to the simulation example 1.

FIG. 10A shows irradiance on the evaluation surface in the case that a coherent and parallel beam of light is incident on the diffuser according to the simulation example 1. The unit of irradiance is watt per square centimeter, and irradiance is represented by darkness.

Figure 10B:
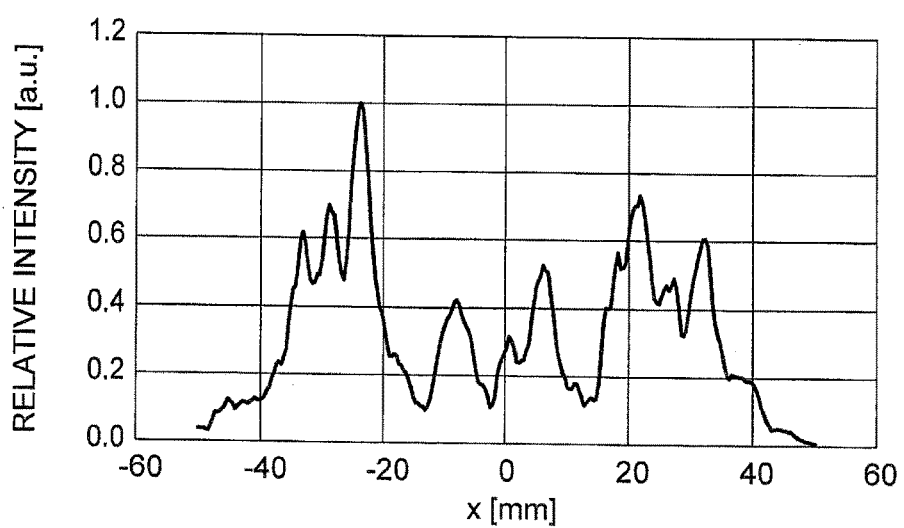
FIG. 10B shows irradiance on the evaluation surface in the case that a coherent and parallel beam of light is incident on the diffuser according to the simulation example 1.

FIG. 10B shows irradiance on the evaluation surface in the case that a coherent and parallel beam of light is incident on the diffuser according to the simulation example 1. The horizontal axis of FIG. 10B represents x coordinate, and the vertical axis of FIG. 10B represents relative intensity of irradiance. The relative intensity is defined such that the peak value of irradiance corresponds to 1. The x coordinate is that of the diffuser, and 0 of the x coordinate corresponds to the center in the x-axis direction of the recess-protrusion structure of the diffuser. The unit of irradiance is watt per square centimeter.

According to FIG. 10A and FIG. 10B, the distribution of irradiance on the evaluation surface of the diffuser according to the simulation example 1 is less uneven than that of the comparative simulation example shown in FIG. 7A and FIG. 7B.

Simulation Example 2

A diffuser according to the simulation example 2 is provided with a two-dimensional recess-protrusion structure as shown in FIG. 4. In other words, the shape of an xz cross section is represented by Expressions (1) and (2). When the y-axis is divided to intervals, and each interval corresponds to a recess portion or a protrusion portion of the recess-protrusion structure, a function g(y) that represents the shape of a yz cross section is represented by interval quadratic functions as below.

$$g(y) = g_m(y) \text{ at } y_m < y < y_{m+1} \quad (4)$$

$$g_m(y) = B \cdot \frac{t_m}{\bar{t}}(-1)^{m+1}\left(2\frac{y-y_m}{t_m} - 1\right)^2 \quad (5)$$

$$t_m = y_{m+1} - y_m$$

$$\bar{t} = \frac{\sum t_m}{M}$$

where m is a positive integer for identifying an interval, $t_m$ is length of interval m, and M is the total number of intervals.

The parameters of Expression (2) and Expression (5) are as below.
A=2.0 (μm)
B=2.0 (μm)
12.5 (μm)<$s_n$<37.5 (μm)
12.5 (μm)<$t_0$<37.5 (μm)
Values of $s_n$ vary from interval to interval, and its distribution is a uniform distribution in the range from 12.5 μm to 37.5 μm. Further, values of $t_m$ vary from interval to interval, and its distribution is a uniform distribution in the range from 12.5 μm to 37.5 μm. In order to generate the uniform distributions, a pseudorandom number series prepared by a programming language was used. In the present example, the following relationships hold when the upper limit and the lower limit are represented respectively as $s_{max}$ and $s_{min}$.

$$\bar{s} = 25 \ (\mu m)$$

$$2 < \frac{s_{max}}{s_{min}} = \frac{37.5}{12.5} = 3$$

Further, the following relationships hold when the upper limit and the lower limit of $t_n$ are represented respectively as $t_{max}$ and $t_{min}$.

$$\bar{t} = 25 \ (\mu m)$$

$$2 < \frac{t_{max}}{t_{min}} = \frac{37.5}{12.5} = 3$$

Figure 11A:
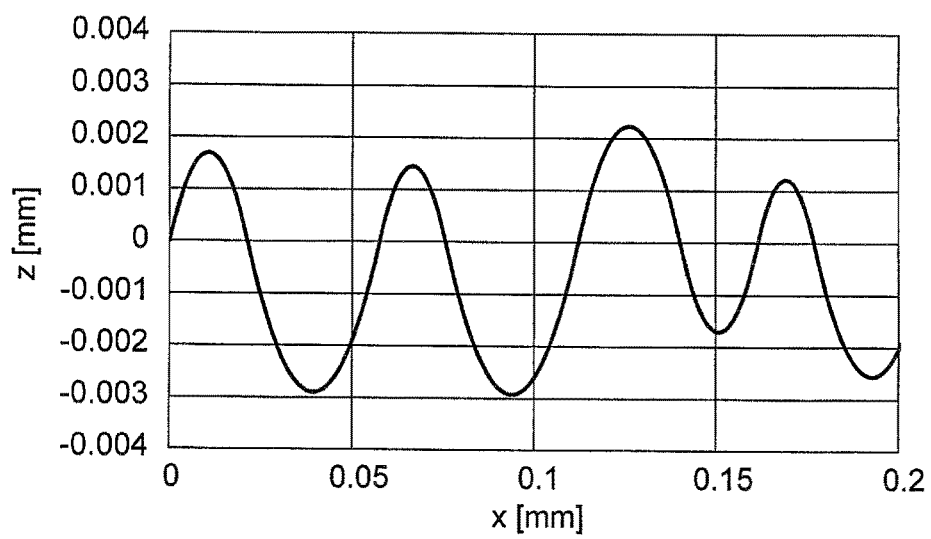
FIG. 11A shows the shape of an xz cross section of the diffuser according to the simulation example 2.

FIG. 11A shows the shape of an xz cross section of the diffuser according to the simulation example 2. The horizontal axis of FIG. 11A represents x coordinate, and the vertical axis of FIG. 11A represents z coordinate.

Figure 11B:
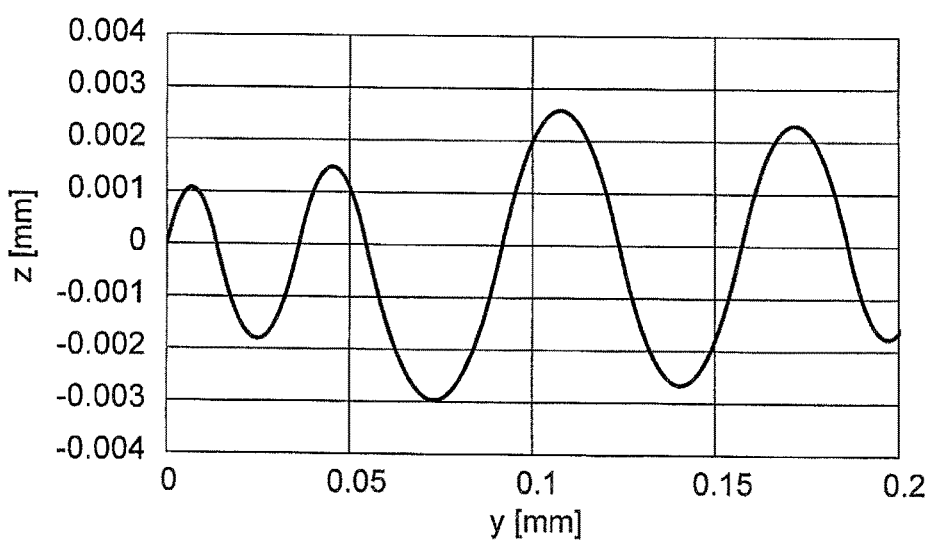
FIG. 11B shows the shape of an yz cross section of the diffuser according to the simulation example 2.

FIG. 11B shows the shape of a yz cross section of the diffuser according to the simulation example 2. The horizontal axis of FIG. 11B represents y coordinate, and the vertical axis of FIG. 11B represents z coordinate.

Figure 12A:
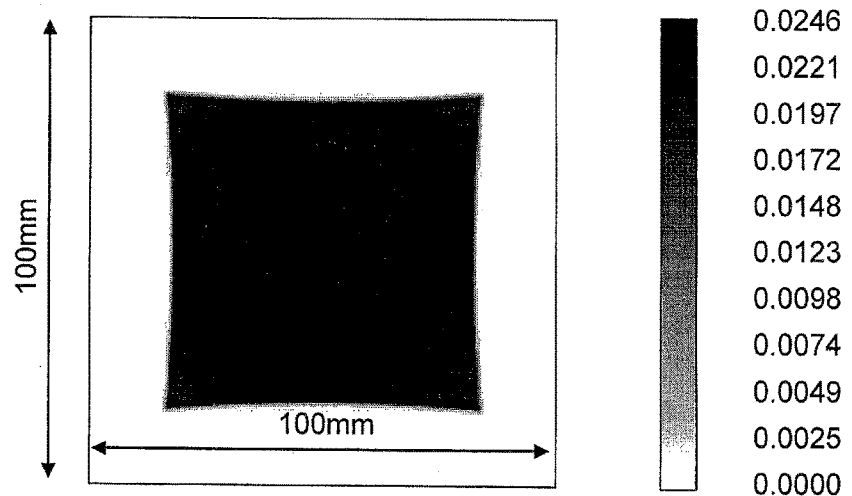
FIG. 12A shows irradiance on the evaluation surface in the case that an incoherent and parallel beam of light is incident on the diffuser according to the simulation example 2.

FIG. 12A shows irradiance on the evaluation surface in the case that an incoherent and parallel beam of light is incident on the diffuser according to the simulation example 2. The unit of irradiance is watt per square centimeter, and irradiance is represented by darkness.

Figure 12B:
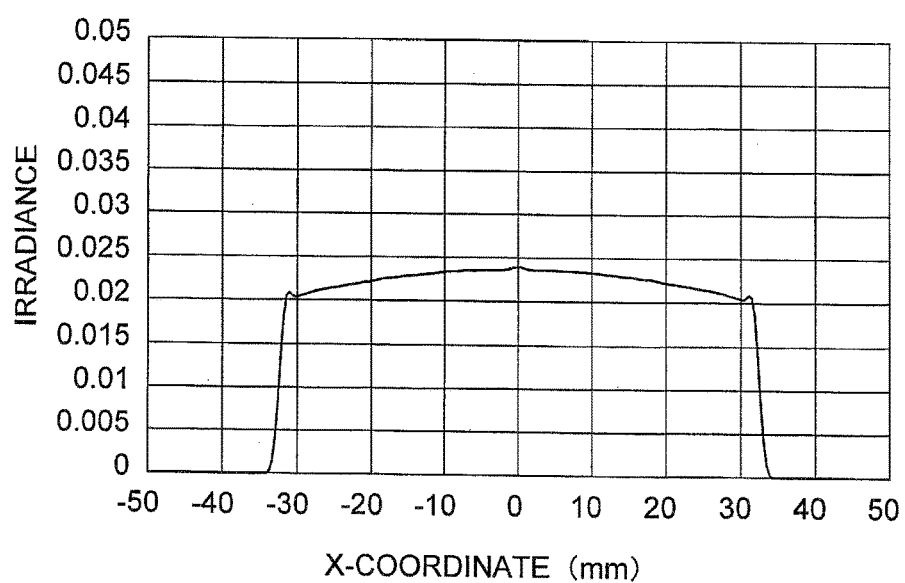
FIG. 12B shows irradiance on the evaluation surface in the case that an incoherent and parallel beam of light is incident on the diffuser according to the simulation example 2.

FIG. 12B shows irradiance on the evaluation surface in the case that an incoherent and parallel beam of light is incident on the diffuser according to the simulation example 2. The horizontal axis of FIG. 12B represents x coordinate, and the vertical axis of FIG. 12B represents irradiance. The x coordinate is that of the diffuser, and 0 of the x coordinate corresponds to the center in the x-axis direction of the recess-protrusion structure of the diffuser. Values of irradiance shown in FIG. 12B are those obtained in the case that y coordinate of the y-axis of the diffuser is 0. The unit of irradiance is watt per square centimeter.

The range of the divergence angle in an x-z cross section of the simulation example 2 is ±8.76 degrees according to Expression (3). Accordingly, the width in the x-axis direction of the irradiated area on the evaluation surface can be calculated as below.

$$2 \cdot 200 \cdot \tan(8.76°) = 61.6 \text{ (mm)}$$

The above-described value is substantially equal to that of the width in the x-axis direction of the irradiated area shown in FIG. 12B.

According to FIG. 12A and FIG. 12B, by the diffuser of the simulation example 2 an incident beam of light is diverged to a beam of light that provides a substantially even distribution of irradiance on the evaluation surface.

Figure 13A:
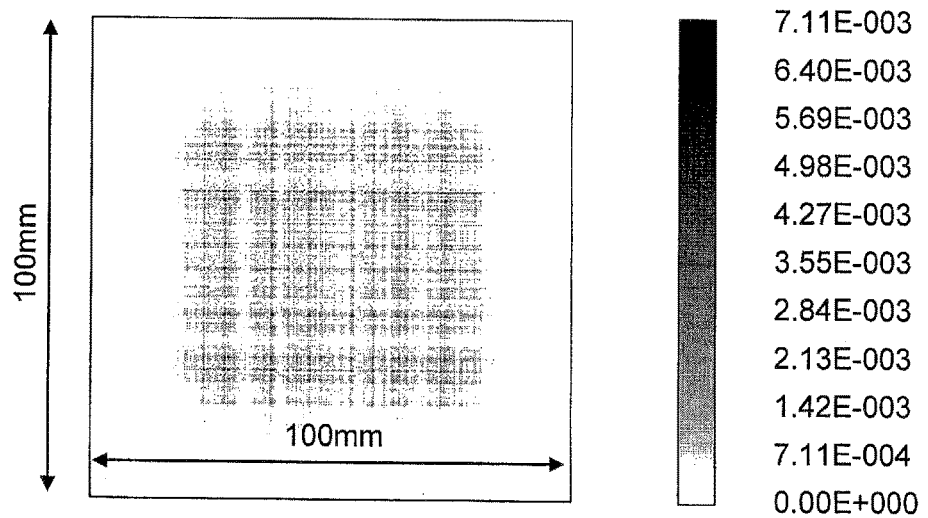
FIG. 13A shows irradiance on the evaluation surface in the case that a coherent and parallel beam of light is incident on the diffuser according to the simulation example 2.

FIG. 13A shows irradiance on the evaluation surface in the case that a coherent and parallel beam of light is incident on the diffuser according to the simulation example 2. The unit of irradiance is watt per square centimeter, and irradiance is represented by darkness.

Figure 13B:
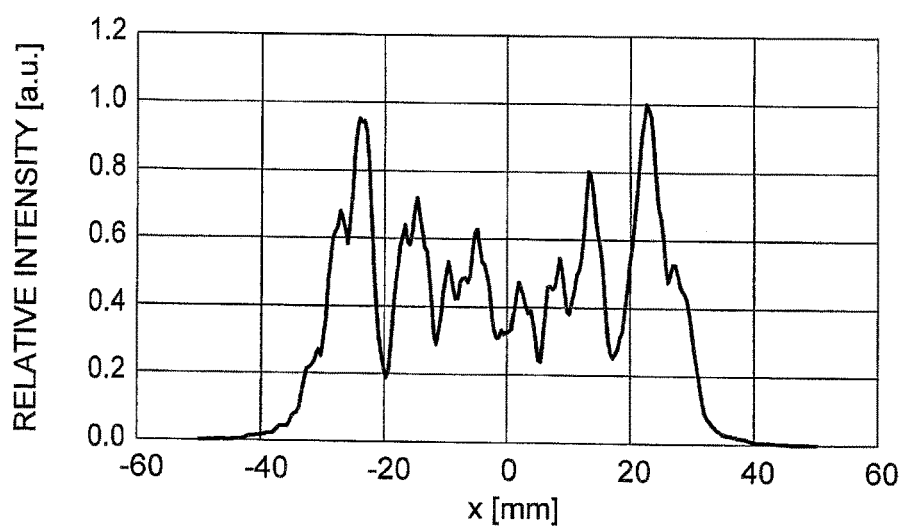
FIG. 13B shows irradiance on the evaluation surface in the case that a coherent and parallel beam of light is incident on the diffuser according to the simulation example 2.

FIG. 13B shows irradiance on the evaluation surface in the case that a coherent and parallel beam of light is incident on the diffuser according to the simulation example 2. The horizontal axis of FIG. 13B represents x coordinate, and the vertical axis of FIG. 13B represents relative intensity of irradiance. The relative intensity is defined such that the peak value of irradiance corresponds to 1. The x coordinate is that of the diffuser, and 0 of the x coordinate corresponds to the center in the x-axis direction of the recess-protrusion structure of the diffuser. Values of irradiance shown in FIG. 13B are those obtained in the case that y coordinate of the y-axis of the diffuser is 0. The unit of irradiance is watt per square centimeter.

According to FIG. 13B, the distribution of irradiance on the evaluation surface of the diffuser according to the simulation example 2 is less uneven than that of the comparative simulation example shown in FIG. 7B.

The above-described simulation has proved that the diffuser in which length $s_n$ of interval n and length $t_m$ of interval m are made to vary respectively in Expression (2) and Expression (5) diverges a coherent and parallel beam of light more evenly.

Manufacturing Method of a Diffuser

A manufacturing method of a diffuser according to the present invention will be described.

Figure 14:
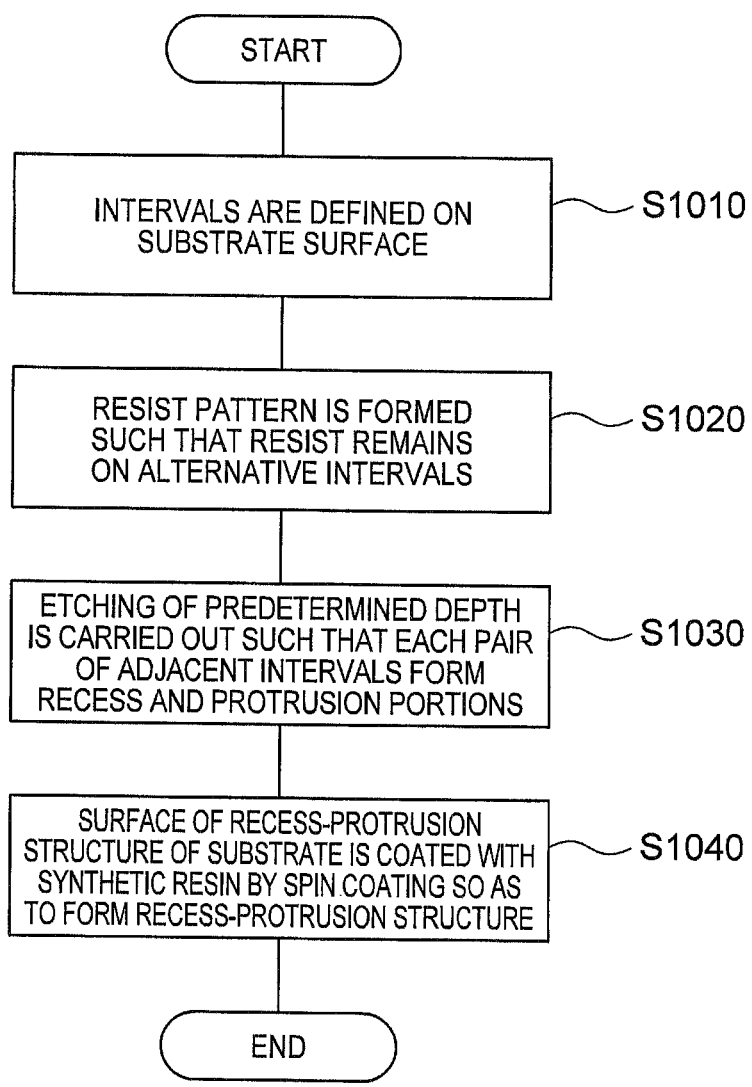
FIG. 14 is a flow chart for illustrating an example of a manufacturing method of a diffuser according to the present invention.

FIG. 14 is a flow chart for illustrating an example of a manufacturing method of a diffuser according to the present invention.

FIGS. 15A to 15E are diagrams for illustrating an example of the manufacturing method of the diffuser according to the present invention.

In step S1010 of FIG. 14, intervals are defined on a substrate surface. On the substrate surface, an x-axis is defined, and the range of interval n' is defined as below. n' is a positive integer for identifying each interval.

$$x_{n'} < x < x_{n'+1}$$

Further, width $s_n$ of interval n' is defined as below.

$$s_{n'} < x_{n'+1} - x_{n'}$$

Width $s_{n'}$ of interval n' is made to vary in the range between $s_{max'}$ and $s_{min'}$ inclusive, which satisfy $$2 < \frac{s_{max}}{s_{min}}$$

where $s_{max'}$ and $s_{min'}$ represent the maximum value and the minimum value of width $s_{n'}$ of interval n', respectively. More specifically, in order to generate a uniform distribution, a pseudorandom number sequence prepared in a programming language may be used.

On the substrate surface, a y-axis that is orthogonal to the x-axis is defined, and the range of interval m' is defined as below. m' is a positive integer for identifying each interval.

$$y_{m'} < y < y_{m'+1}$$

Further, width $t_{m'}$ of interval m' is defined as below.

$$t_{m'} = y_{m'+1} - y_{m'}$$

Width $t_{m'}$ of interval m' is made to vary in the range between $t_{max}'$ and $t_{min}'$ inclusive, which satisfy $$2 < \frac{t'_{max}}{t'_{min}}$$

where $t_{max}'$ and $t_{min}'$ represent the maximum value and the minimum value of width $t_{m'}$ of interval m', respectively. More specifically, in order to generate a uniform distribution, a pseudorandom number sequence prepared in a programming language may be used.

When a one-dimensional recess-protrusion structure as shown in FIG. 3 is manufactured, intervals in the y-axis direction are not defined.

In step S1020 of FIG. 14, a resist pattern is formed such that a resist remains on alternate intervals.

Figure 15A:
FIG. 15A shows a substrate on which a resist pattern is not formed yet.

FIG. 15A shows a substrate on which a resist pattern is not formed yet.

Figure 15B:
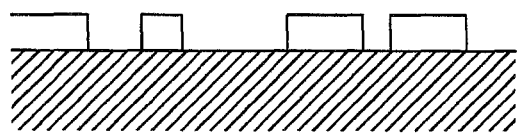
FIG. 15B shows the substrate on which a resist pattern has been formed.

FIG. 15B shows the substrate on which a resist pattern has been formed.

In step S1030 of FIG. 14, etching of a predetermined depth is carried out such that in each of adjacent intervals, a recess portion and a protrusion portion are formed respectively. The recess-protrusion structure of the substrate thus obtained is referred to as a provisional recess-protrusion structure.

Figure 15C:
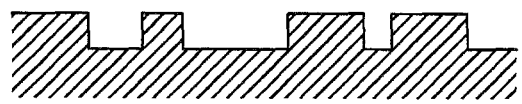
FIG. 15C shows the provisional recess-protrusion structure formed after etching.

FIG. 15C shows the provisional recess-protrusion structure formed after etching.

In step S1040 of FIG. 14, the surface of the provisional recess-protrusion structure is coated with a synthetic resin by spin coating so as to form a recess-protrusion structure of the synthetic resin. The recess-protrusion structure of the synthetic resin thus obtained is referred to as a final recess-protrusion structure.

Figure 15D:
FIG. 15D shows the final recess-protrusion structure formed by coating the provisional recess-protrusion structure of the surface with the synthetic resin.

FIG. 15D shows the final recess-protrusion structure formed by coating the provisional recess-protrusion structure of the substrate with the synthetic resin. When the surface of the provisional recess-protrusion structure is coated with the synthetic resin by spin coating, the profile of the final recess-protrusion structure becomes smoothly curvilinear because of fluidity of the synthetic resin. The shape of the final recess-protrusion structure is determined by width and depth of intervals of the provisional recess-protrusion structure, properties of a synthetic resin used for coating, and a coating thickness. The important properties of the synthetic resin are fluidity and viscosity. Further, the coating thickness of the synthetic resin can be determined by the number of revolutions of the spinner. Relationships of the shape of the final recess-protrusion structure to width and depth of intervals of the provisional recess-protrusion structure and the coating thickness will be described in detail later.

The product with the final recess-protrusion structure shown in FIG. 15D can be used as a diffuser. Alternatively, the product with the final recess-protrusion structure can be used as a mold for manufacturing diffusers in volume.

Figure 16:
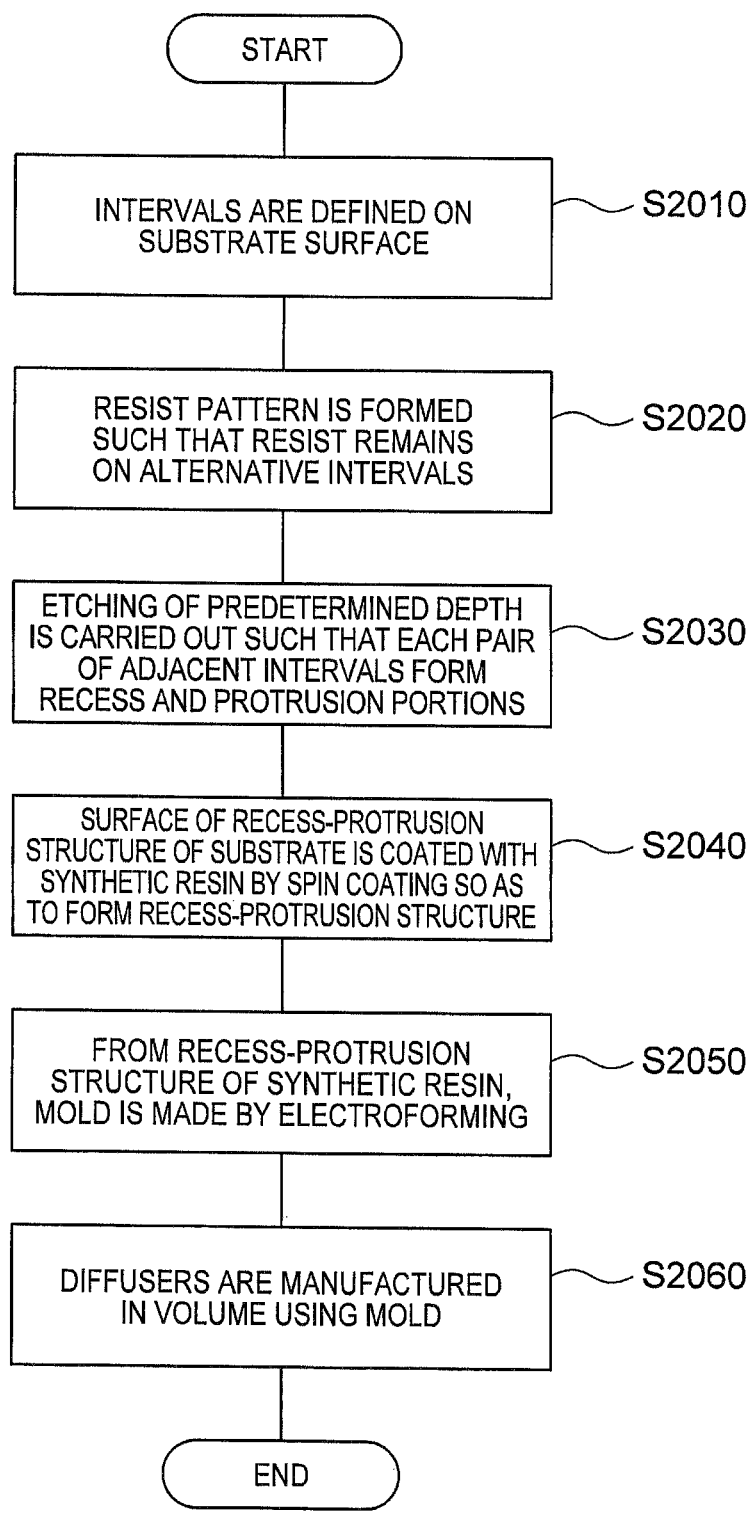
FIG. 16 is a flow chart for illustrating another example of a manufacturing method of a diffuser according to the present invention.

FIG. 16 is a flow chart for illustrating another example of a manufacturing method of a diffuser according to the present invention.

Steps S2010 to S2040 in FIG. 16 are identical with steps S1010 to S1040 in FIG. 14.

In step S2050 in FIG. 16, from the recess-protrusion structure of the synthetic resin, a mold provided with a recess-protrusion structure is made by electroforming.

Figure 15E:
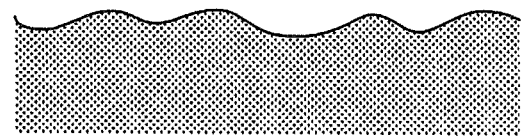
FIG. 15E shows the mold provided with the recess-protrusion structure made by electroforming.

FIG. 15E shows the mold provided with the recess-protrusion structure made by electroforming.

In step S2060 in FIG. 16, diffusers are manufactured in volume using the mold.

Relationships of the shape of the final recess-protrusion structure to width and depth of intervals of the provisional recess-protrusion structure and the coating thickness will be described below. A so-called binary grating having intervals of a fixed length is employed as a provisional recess-protrusion structure, and the binary grating is coated with a synthetic resin by spin coating. The fixed length of interval is referred to as a pitch. The material of the provisional recess-protrusion structure is silicon. The synthetic resin used for spin coating is a photoresist (trade name (AZ1500)). The number of revolutions of the spinner is 1000 rpm.

Figure 17A:
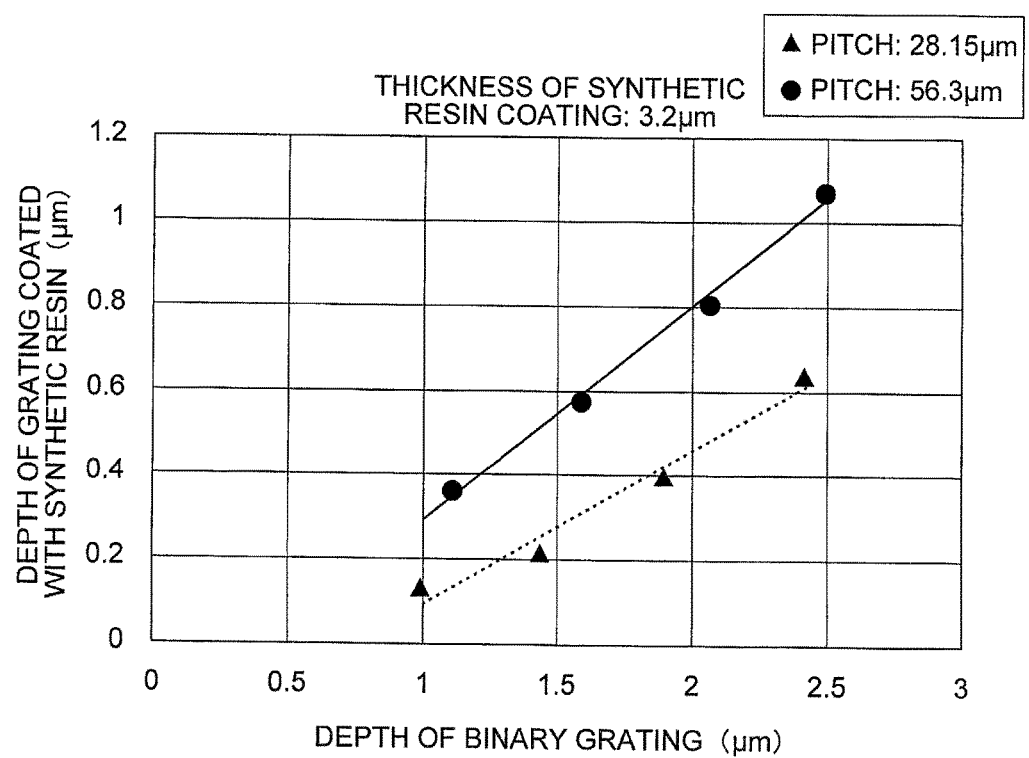
FIG. 17A shows relationships between depth of provisional recess-protrusion structures and depth of final recess-protrusion structures.

FIG. 17A shows relationships between depth of provisional recess-protrusion structures, that is, the binary gratings and depth of final recess-protrusion structures, that is, the gratings coated with the synthetic resin. The horizontal axis of FIG. 17A represents depth of the provisional recess-protrusion structures, and the vertical axis of FIG. 17A represents depth of the final recess-protrusion structures. The thickness of the synthetic resin coating is 3.2 micrometers. The solid line in FIG. 17A represents a relationship between depth of a provisional recess-protrusion structure and depth of the corresponding final recess-protrusion structure in the case that the pitch is 28.15 micrometers, and the dotted line in FIG. 17A represents a relationship between depth of a provisional recess-protrusion structure and depth of the corresponding final recess-protrusion structure in the case that the pitch is 56.3 micrometers. According to FIG. 17A, depth of the final recess-protrusion structures increases proportionally to depth of the provisional recess-protrusion structures independently of pitch. Further, when depth of the provisional recess-protrusion structures is fixed at the same value, depth of the final recess-protrusion structures increases with pitch.

Figure 17B:
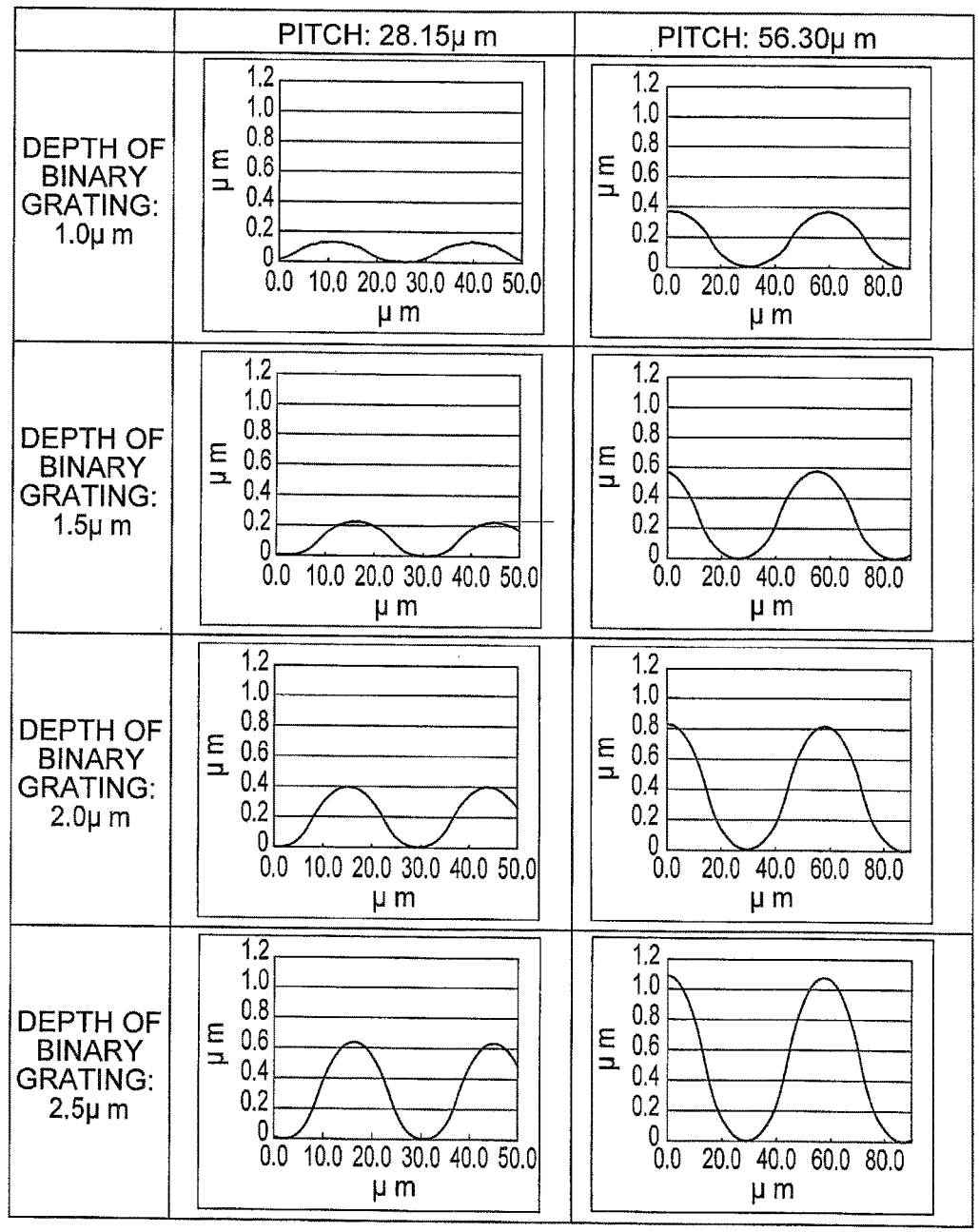
FIG. 17B shows cross sections of the final recess-protrusion structures, each of which corresponds to one of measurements of depth of the final recess-protrusion structures in FIG. 17A.

FIG. 17B shows cross sections of the final recess-protrusion structures, each of which corresponds to one of the measurements of depth of the final recess-protrusion structures in FIG. 17A These cross sections correspond to the xz cross section shown in FIG. 5, for example. Any of the cross sections shown in FIG. 17B is smoothly curvilinear, and each interval of a recess portion or a protrusion portion can be represented by a quadratic function. Further, according to FIG. 17B, values of interval length, that is, pitches of the provisional recess-protrusion structures and values of interval length, that is, pitches of the corresponding final recess-protrusion structures are the same.

Figure 18:
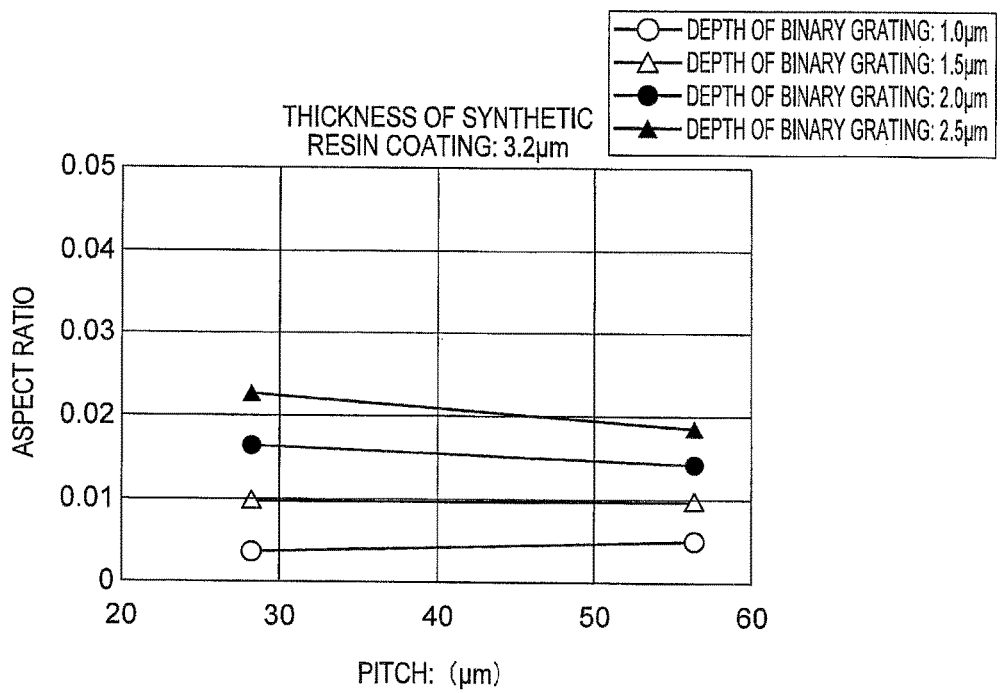
FIG. 18 shows relationships between values of interval length, that is, pitches of the provisional recess-protrusion structures and aspect ratios of the final recess-protrusion structures.

FIG. 18 shows relationships between interval length of the provisional recess-protrusion structures, that is, pitch of the binary gratings and aspect ratio of the final recess-protrusion structures. The aspect ratio of the final recess-protrusion structures is a ratio between depth and pitch of the final recess-protrusion structures. The data used for FIG. 18 are identical with the data used for FIG. 17A The thickness of the synthetic resin coating is 3.2 micrometers. The maximum value and the minimum value of the aspect ratio in the case that the depth of the binary grating is 2.5 micrometers are 0.022 and 0.019, respectively, and the ratio of the maximum value to the minimum value is 1.16. The maximum value and the minimum value of the aspect ratio in the case that the depth of the binary grating is 2.0 micrometers are 0.017 and 0.015, respectively, and the ratio of the maximum value to the minimum value is 1.13. The maximum value and the minimum value of the aspect ratio in the case that the depth of the binary grating is 1.5 micrometers are 0.01 and 0.01, respectively, and the ratio of the maximum value to the minimum value is 1.0. The maximum value and the minimum value of the aspect ratio in the case that the depth of the binary grating is 1.0 micrometer are 0.005 and 0.003, respectively, and the ratio of the maximum value to the minimum value is 1.67. Thus, when the depth of the binary grating is 1.5, 2.0 and 2.5 micrometers, the ratio of the maximum value to the minimum value is less than 1.2.

Figure 19:
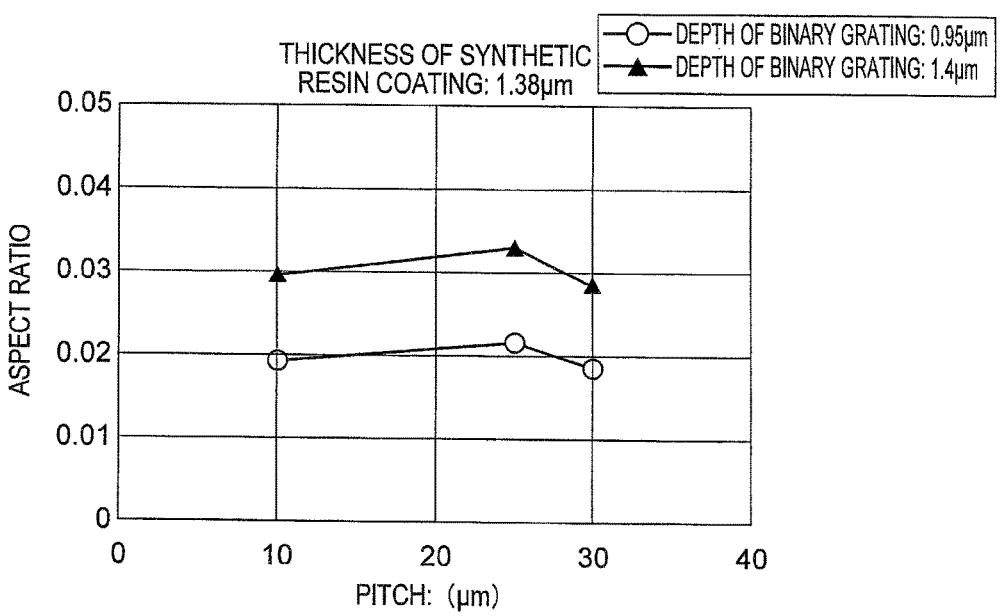
FIG. 19 shows relationships between values of interval length, that is, pitches of the provisional recess-protrusion structures and aspect ratios of the final recess-protrusion structures.

FIG. 19 shows relationships between interval length of the provisional recess-protrusion structures, that is, pitch of the binary gratings and aspect ratio of the final recess-protrusion structures. The thickness of the synthetic resin coating is 1.38 micrometers. The maximum value and the minimum value of the aspect ratio in the case that the depth of the binary grating is 1.4 micrometers are 0.033 and 0.028, respectively, and the ratio of the maximum value to the minimum value is 1.18. The maximum value and the minimum value of the aspect ratio in the case that the depth of the binary grating is 0.95 micrometers are 0.022 and 0.019, respectively, and the ratio of the maximum value to the minimum value is 1.16. Thus, when the depth of the binary grating is 0.95 and 1.4 micrometers, the ratio of the maximum value to the minimum value is less than 1.2.

Thus, by coating a binary grating with a synthetic resin by spin coating, a final recess-protrusion structure in which a cross section corresponding to an xz cross section is smoothly curvilinear and a recess portion or a protrusion portion in each interval can be approximated by a quadratic function can be obtained. Further, the ratio between the maximum value and the minimum value of the aspect ratio of each of the final recess-protrusion structures is less than 1.2 independently of interval length and interval depth of the corresponding provisional recess-protrusion structure. The fact that the aspect ratios of the final recess-protrusion structures are about the same means that depth of each of the final recess-protrusion structures is substantially proportional to pitch of the corresponding provisional recess-protrusion structure. Thus, the aspect ratio of each interval of each of the final recess-protrusion structures is about the same.

EXAMPLE

At first, a manufacturing method of a diffuser of an example will be described. According to step S1010 of FIG. 14, an x-axis is defined on a glass substrate surface, and interval n' in the x-axis direction are defined. The maximum value of width $s_{n'}$ of intervals n' is represented as $s_{max}'=15$ (micrometers), the minimum value of width $s_{n'}$ of interval n' is represented as $s_{min}'=5$ (micrometers), and values of width $s_{n'}$ were made to be evenly distributed between the maximum value and the minimum value inclusive. Intervals in the y-axis direction were not defined. The refractive index of the glass used for the glass substrate is 1.457 at the wavelength of 0.66 micrometers. According to steps S1020 and S1030 of FIG. 14, a resist pattern was formed on the substrate surface, and then a provisional recess-protrusion structure was formed by etching of depth of 3.1 micrometers. According to step S1040 of FIG. 14, the surface of the provisional recess-protrusion structure was coated with OEBR1000 (trade name) that is an acrylic by spin coating to form a final recess-protrusion structure. The number of revolutions of the spinner was 1000 rpm. The thickness of the synthetic resin was 3.823 micrometers. The refractive index of the synthetic resin is 1.474 at the wavelength of 0.66 micrometers. Thus, a one dimensional diffuser like the diffuser shown in FIG. 3 was manufactured.

In general, the ratio between thickness of a synthetic resin coating and depth of a provisional recess-protrusion structure ranges from 0.5 to 5. Further, the ratio between depth of the provisional recess-protrusion structure and width $s_n$ of interval n' ranges from 0.01 to 5. Depth of the provisional recess-protrusion structure is 100 micrometers or less because of restrictions on spin coating.

Figure 20A:
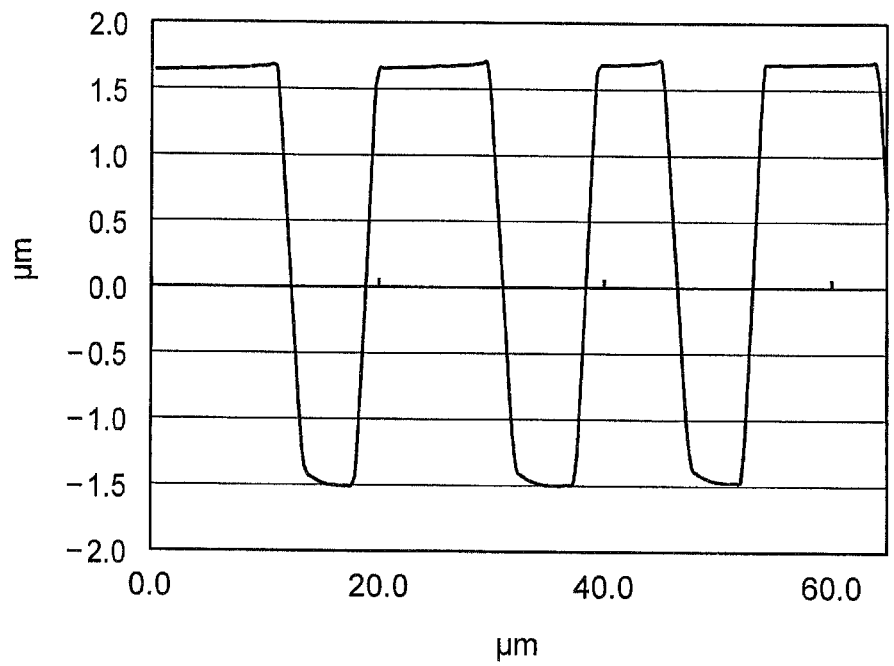
FIG. 20A shows an xz cross section of the provisional recess-protrusion structure of the diffuser according to the example.

FIG. 20A shows an xz cross section of the provisional recess-protrusion structure of the diffuser according to the example. The horizontal axis of FIG. 20A represents x coordinate, and the vertical axis of FIG. 20A represents z coordinate. "0" of z coordinate is determined such that "0" corresponds to the average value of z coordinate of the recess-protrusion structure.

Figure 20B:
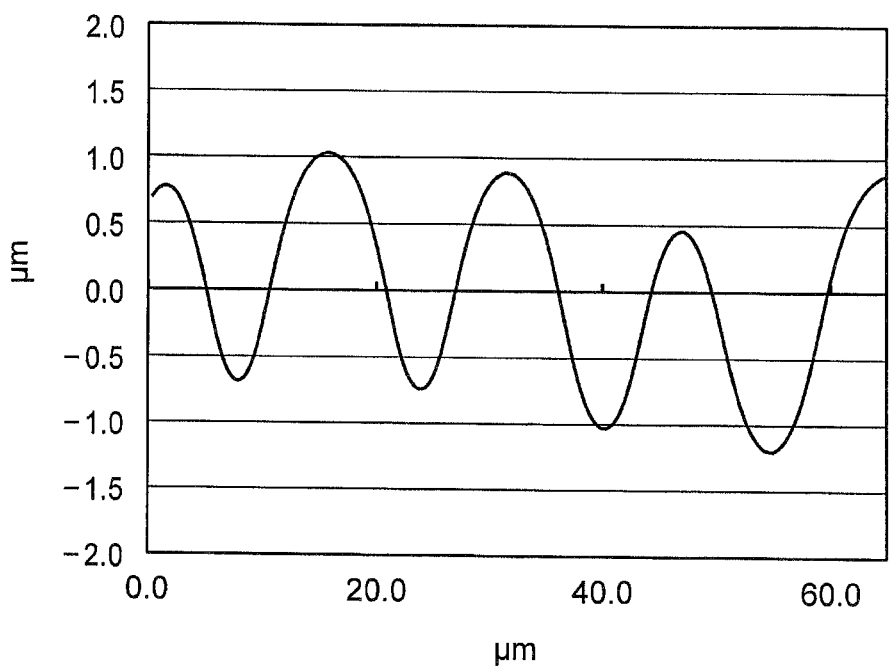
FIG. 20B shows an xz cross section of the final recess-protrusion structure of the diffuser according to the example.

FIG. 20B shows an xz cross section of the final recess-protrusion structure of the diffuser according to the example. The horizontal axis of FIG. 20B represents x coordinate, and the vertical axis of FIG. 20B represents z coordinate. "0" of z coordinate is determined such that "0" corresponds to the average value of z coordinate of the recess-protrusion structure. According to 20B, the profile of the xz cross section is smoothly curvilinear, and a recess portion or a protrusion portion in each interval can be represented by a quadratic function. An aspect ratio of each interval of a recess portion or a protrusion portion ranges from 0.104 to 0.121, and the ratio of the maximum value to the minimum value of aspect ratios of the intervals is less than 1.2.

Figure 21:
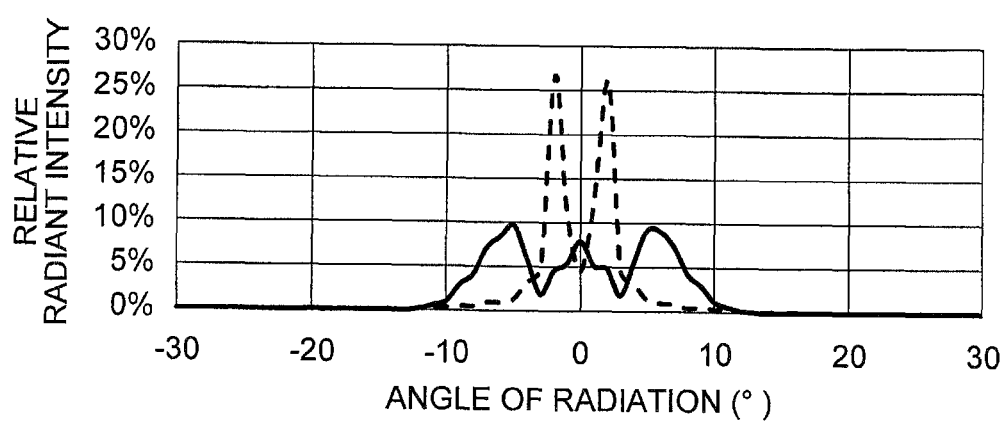
FIG. 21 shows property of diffusion of the diffuser of the example.

FIG. 21 shows property of diffusion of the diffuser of the example. The horizontal axis of FIG. 21 represents angle of radiation, and the vertical axis of FIG. 21 represents relative radiant intensity. The angle of radiation corresponds to the divergence angle described using FIG. 1. Values of relative radiant intensity (%) are determined such that the relative radiant intensity of the incident light is 100%. The dashed line of FIG. 21 shows diffusion in the case that a parallel laser beam at wavelength of 0.66 micrometers is incident onto a surface of the glass substrate provided with the provisional recess-protrusion structure that is not coated with the synthetic resin. The laser beam is incident onto the surface that is not provided with the recess-protrusion structure. The solid line of FIG. 21 shows diffusion in the case that a parallel laser beam at wavelength of 0.66 micrometers is incident onto a surface of the diffuser of the example provided with the final recess-protrusion structure. The laser beam is incident onto the surface that is not provided with the recess-protrusion structure. The distribution of relative radiant intensity generated by the diffuser of the example is more even than the distribution of relative radiant intensity generated by the glass substrate provided with the provisional recess-protrusion structure.

The depth of the provisional recess-protrusion structure is fixed at 3.1 micrometers. Values of width $s_{n'}$ of intervals are evenly distributed in the range from 5 micrometers to 15 micrometers, and aspect ratios of intervals of the provisional recess-protrusion structure are also evenly distributed like values of width $s_{n'}$ of intervals. On the other hand, the ratio of the maximum value to the minimum value of aspect ratios of the intervals of the final recess-protrusion structure is less than 1.2 as described above. Accordingly, the main reason that the distribution of relative radiant intensity generated by the diffuser of the example is more even than the distribution of relative radiant intensity generated by the glass substrate provided with the provisional recess-protrusion structure is considered to be that aspect ratios of the intervals of the final recess-protrusion structure are about the same.

In general, the ratio of the maximum value to the minimum value of aspect ratios of the intervals of the final recess-protrusion structure should preferably be less than 1.3.

What is claimed is:

1. A diffuser provided with a recess-protrusion structure formed on a plane,
wherein when a z-axis is defined as a normal to the plane, an x-axis is defined on the plane, the x-axis is divided into plural intervals, nx represents a positive integer for identifying an interval along the x-axis, Snx represents length in the x-axis direction of an interval nx, Sx-max represents the maximum value of Snx, and Sx-min represents the minimum value of Snx, the relationship $2<Sx\text{-max}/Sx\text{-min}$ holds, Snx varies on a random basis between Sx-min and Sx-max, the recess-protrusion structure is configured such that in an xz cross section, a recess portion and a protrusion portion are formed on each of adjacent intervals along the x-axis, respectively, and when dznx represents a difference between the maximum value and the minimum value of z coordinate of the recess-protrusion structure in the interval nx in the xz cross section, Anx represents a ratio between dznx and Snx, Anx-max represents the maximum value of Anx, and Anx-min represents the minimum value of Anx, the recess-protrusion structure is configured such that the relationship $Ax\text{-max}/Ax\text{-min}<1.3$ holds.

2. A diffuser according to claim 1, wherein when in the xz cross section, z coordinate of the recess-protrusion structure is represented as a function of x, the function of x on each interval can be approximated by a smooth function.

3. A diffuser according to claim 2, wherein the function of x on each interval can be approximated by a quadratic function.

4. A diffuser according to claim 1, wherein when a y-axis is defined on the plane so as to be orthogonal to the x-axis, the recess-protrusion structure is configured such that the shape of an xz cross section is identical independently of y coordinate.

5. A diffuser according to claim 1, wherein when a y-axis is defined on the plane so as to be orthogonal to the x-axis, the y-axis is divided into plural intervals, my represents a positive integer for identifying an interval along the y-axis, Smy represents length in the y-axis direction of an interval my, Sy-max represents the maximum value of Smy, and Sy-min represents the minimum value of Smy, the relationship $2<Sy\text{-max}/Sy\text{-min}$ holds, Smy varies on a random basis between Sy-min and Sy-max, the recess-protrusion structure is configured such that in a yz cross section, a recess portion and a protrusion portion are formed on each of adjacent intervals along the y-axis, respectively, and when dzmy represents a difference between the maximum value and the minimum value of z coordinate of the recess-protrusion structure in the interval my in the yz cross section, Amy represents a ratio between dznx and Smy, Ay-max represents the maximum value of Amy, and Ay-min represents the minimum value of Amy, the recess-protrusion structure is configured such that the relationship $Ay\text{-max}/Ay\text{-min}<1.3$ holds.

6. A method for manufacturing a diffuser provided with a recess-protrusion structure,
wherein when a z-axis is defined as a normal to a flat surface of a substrate, and an x-axis is defined on the flat surface, the method includes the steps of
dividing the x-axis into plural intervals such that the relationship $2<Sx'\text{-max}/Sx'\text{-min}$ holds, and Snx' varies on a random basis between Sx'-min and Sx'-max, where nx' represents a positive integer for identifying an interval along the x-axis, Snx' represents length in the x-axis direction of an interval nx', Sx'-max represents the maximum value of Snx', and Sx'-min represents the minimum value of Snx';
forming a provisional recess-protrusion structure on the substrate by etching such that in an xz cross section, a recess portion and a protrusion portion are formed on each of adjacent intervals along the x-axis, respectively; and
forming a synthetic resin coating on the provisional recess-protrusion structure by spin coating such that the relationship $Ax\text{-max}/Ax\text{-min}<1.3$ holds, where an interval nx represents an interval along the x-axis that corresponds to a recess portion or a protrusion portion of the recess-protrusion structure coated with the synthetic resin coating in the xz cross section, Snx represents length in the x-axis direction of the interval nx, dznx represents a difference between the maximum value and the minimum value of z coordinate of the recess-protrusion structure in the interval nx in the xz cross section, Anx represents a ratio between dznx and Snx, Anx-max represents the maximum value of Anx, and Anx-min represents the minimum value of Anx.

7. A method for manufacturing a diffuser according to claim 6, wherein when a y-axis is defined on the flat surface so as to be orthogonal to the x-axis, in the step of forming the provisional recess-protrusion structure, the provisional recess-protrusion structure is formed such that the shape of an xz cross section is identical independently of y coordinate.

8. A method for manufacturing a diffuser according to claim 6, wherein when a y-axis is defined on the flat surface so as to be orthogonal to the x-axis, the method further includes the step of dividing the y-axis into plural intervals, before the step of forming the provisional recess-protrusion structure, such that the relationship $2 < Sy'\text{-max}/Sy'\text{-min}$ holds, and Smy' varies on a random basis between Sy'-min and Sy'-max, where my' represents a positive integer for identifying an interval along the y-axis, Smy' represents length in the y-axis direction of an interval my', Sy'-max represents the maximum value of Smy', and Sy'-min represents the minimum value of Smy', in the step of forming the provisional recess-protrusion structure, the provisional recess-protrusion structure is formed on the substrate such that in a yz cross section, a recess portion and a protrusion portion are formed on each of adjacent intervals along the y-axis, respectively, and in the step of forming the synthetic resin coating, the synthetic resin coating is formed such that the relationship $Ay\text{-max}/Ay\text{-min} < 1.3$ holds, where an interval my represents an interval along the y-axis that corresponds to a recess portion or a protrusion portion of the recess-protrusion structure coated with the synthetic resin coating in the yz cross section, Smy represents length in the y-axis direction of the interval my, dzmy represents a difference between the maximum value and the minimum value of z coordinate of the recess-protrusion structure in the interval my in the yz cross section, Amy represents a ratio between dznx and Smy, Ay-max represents the maximum value of Amy, and Ay-min represents the minimum value of Amy.

* * * * *